(12) United States Patent
Hayashi et al.

(10) Patent No.: US 9,931,880 B2
(45) Date of Patent: Apr. 3, 2018

(54) DECORATIVE ILLUMINATION INK JET RECORDING MATERIAL, DECORATIVE ILLUMINATION IMAGE, METHOD OF FORMING THE SAME, AND DECORATIVE ILLUMINATION SIGNBOARD

(71) Applicant: FUJIFILM CORPORATION, Minato-ku, Tokyo (JP)

(72) Inventors: Toshiaki Hayashi, Fujinomiya (JP); Naoki Koito, Fujinomiya (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/367,182

(22) Filed: Dec. 2, 2016

(65) Prior Publication Data

US 2017/0080735 A1    Mar. 23, 2017

Related U.S. Application Data

(63) Continuation of application No. PCT/JP2015/071713, filed on Jul. 30, 2015.

(30) Foreign Application Priority Data

Jul. 31, 2014    (JP) .................. 2014-157111

(51) Int. Cl.
*B41M 5/50* (2006.01)
*B41M 5/52* (2006.01)
(Continued)

(52) U.S. Cl.
CPC ............ *B41M 5/504* (2013.01); *B41J 2/01* (2013.01); *B41J 11/002* (2013.01);
(Continued)

(58) Field of Classification Search
CPC ...... B41M 5/504; B41M 5/506; B41M 5/508; B41M 5/5218; Y10T 428/24802
See application file for complete search history.

(56) References Cited

U.S. PATENT DOCUMENTS

| 5,912,085 A | 6/1999 | Ito et al. |
| 6,180,227 B1 | 1/2001 | Bourdelais et al. |

(Continued)

FOREIGN PATENT DOCUMENTS

| JP | H05-124330 A | 5/1993 |
| JP | H06-91810 A | 4/1994 |

(Continued)

OTHER PUBLICATIONS

International Search Report issued in International Application No. PCT/JP2015/071713 dated Sep. 8, 2015.
(Continued)

*Primary Examiner* — Betelhem Shewareged
(74) *Attorney, Agent, or Firm* — Solaris Intellectual Property Group, PLLC

(57) ABSTRACT

To provide a decorative illumination ink jet recording material having a resin base, an ink accepting layer that is disposed as an outermost layer and contains a resin, a layer that contains a metal oxide, and a white layer that contains white particles and a resin, a decorative illumination image, a method of forming the decorative illumination image, and a decorative illumination signboard.

19 Claims, 1 Drawing Sheet

(51) Int. Cl.
  *C09D 11/30*     (2014.01)
  *B41J 2/01*      (2006.01)
  *B41J 11/00*     (2006.01)
  *B41M 5/00*      (2006.01)
  *G09F 13/04*     (2006.01)

(52) U.S. Cl.
  CPC ........ *B41M 5/0047* (2013.01); *B41M 5/0064* (2013.01); *B41M 5/506* (2013.01); *B41M 5/508* (2013.01); *B41M 5/52* (2013.01); *B41M 5/5218* (2013.01); *B41M 5/5272* (2013.01); *B41M 5/5281* (2013.01); *C09D 11/30* (2013.01); *G09F 13/04* (2013.01); *B41M 2205/34* (2013.01); *B41M 2205/36* (2013.01); *B41M 2205/38* (2013.01); *B41M 2205/40* (2013.01); *Y10T 428/24802* (2015.01)

(56) References Cited

U.S. PATENT DOCUMENTS

| | | | |
|---|---|---|---|
| 6,531,231 | B1 | 3/2003 | Ito et al. |
| 6,605,337 | B1* | 8/2003 | Mori ........................ B41M 3/008 428/195.1 |
| 6,720,042 | B2* | 4/2004 | Ylitalo ................. B41M 7/0081 428/32.1 |
| 2002/0068134 | A1* | 6/2002 | Yagi ........................ G02B 1/111 428/1.1 |
| 2003/0076596 | A1* | 4/2003 | Miyatake ................. G02B 1/11 359/601 |
| 2004/0157972 | A1* | 8/2004 | Yamaguchi ............... B32B 5/00 524/430 |
| 2009/0130309 | A1* | 5/2009 | Kawakami ............ B41M 5/502 427/261 |
| 2017/0080735 | A1* | 3/2017 | Hayashi ................... B41M 5/00 |

FOREIGN PATENT DOCUMENTS

| | | |
|---|---|---|
| JP | H09-20069 A | 1/1997 |
| JP | H09-66665 A | 3/1997 |
| JP | H10-226156 A | 8/1998 |
| JP | 2000-190632 A | 7/2000 |
| JP | 2001-010203 A | 1/2001 |
| JP | 2001-255837 A | 9/2001 |
| JP | 2002-356057 A | 12/2002 |
| JP | 2003-25719 A | 1/2003 |
| JP | 2003-80834 A | 3/2003 |
| JP | 2003-164798 A | 6/2003 |
| JP | 2004-223876 A | 8/2004 |
| JP | 2005-280009 A | 10/2005 |
| JP | 2008-50430 A | 3/2008 |
| JP | 2010-85959 A | 4/2010 |
| WO | 2010/079765 A1 | 7/2010 |

OTHER PUBLICATIONS

Written Opinion of the ISA issued in International Application No. PCT/JP2015/071713 dated Sep. 8, 2015.

English language translation of the following: Office action dated Aug. 8, 2017 from the JPO in a Japanese patent application No. 2016-538451 corresponding to the instant patent application. This office action translation is submitted now in order to supplement the understanding of the cited reference which is being disclosed in the instant Information Disclosure Statement.

English language translation of the following: Office action dated Nov. 7, 2017 from the JPO in a Japanese patent application No. 2016-538451 corresponding to the instant patent application. This office action translation is submitted now in order to supplement the understanding of the cited reference which is being disclosed in the instant Information Disclosure Statement.

\* cited by examiner

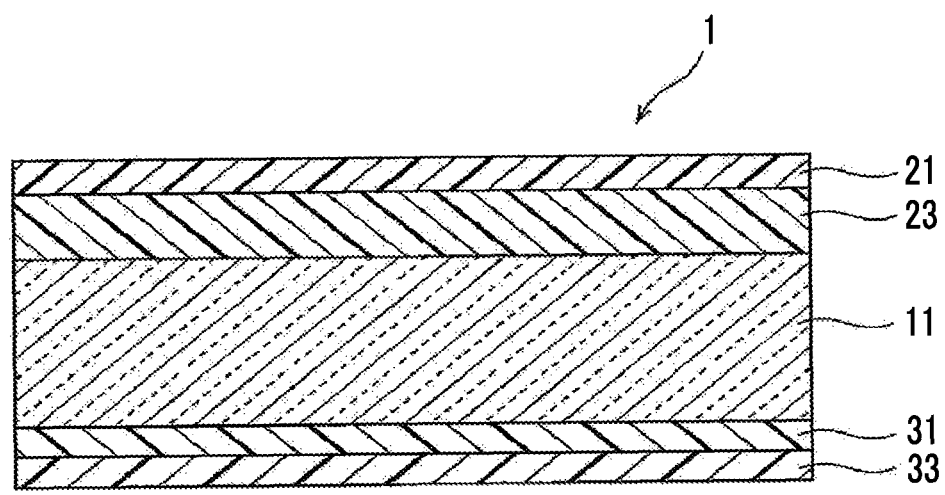

DECORATIVE ILLUMINATION INK JET RECORDING MATERIAL, DECORATIVE ILLUMINATION IMAGE, METHOD OF FORMING THE SAME, AND DECORATIVE ILLUMINATION SIGNBOARD

CROSS-REFERENCE TO RELATED APPLICATIONS

This application is a continuation application of International Application No. PCT/JP2015/071713, filed Jul. 30, 2015, the disclosure of which is incorporated herein by reference in its entirety. Further, this application claims priority from Japanese Patent Application No. 2014-157111, filed Jul. 31, 2014, the disclosure of which is incorporated herein by reference in its entirety.

BACKGROUND OF THE INVENTION

1. Field of the Invention

The present disclosure relates to a decorative illumination ink jet recording material, a decorative illumination image, a method of forming the decorative illumination image, and a decorative illumination signboard.

2. Description of the Related Art

Many printers use an ink jet system that discharges an ink in a dropwise manner from an ink discharge port since the system is small and inexpensive and can form an image on a recording medium in a non-contact manner. Among ink jet systems, piezo ink jet systems that discharge an ink using deformation of a piezoelectric element, and thermal ink jet systems that discharge an ink in a dropwise manner using a boiling phenomenon of the ink that is caused by thermal energy have advantages in that a high-resolution image is obtained and these have excellent high-speed printing properties.

Recently, ink jet systems have been used not only to print photographs or documents for home or office use, but also to perform printing for commercial or industrial use. For example, demand for an image forming method for producing an image that is used for a large decorative illumination signboard to be attached to a store window, a station passage, a wall of a building, or the like by an ink jet system is raised.

A decorative illumination signboard is a signboard that is observed as a transmission image by light from a backlight source in the night without sunshine. In a case where a decorative illumination signboard is made by an ink jet system, a transparent ink jet recording material is used as a recording medium. Furthermore, since the decorative illumination signboard is installed outdoors, an ink jet recording material in which an ink accepting layer is disposed on a resin base having excellent water resistance is used.

An ink jet recording material including a resin base for forming a transparent image has been known.

For example, in JP 1997-20069A (JP-H09-20069A), an ink jet recording material having a light transmittance of 60% or greater in which an ink accepting layer is provided on one surface of a base film such as a polyester film is described. In Example 4 in JP1997-20069A (JP-H09-20069A), an ink jet recording material having: an ink accepting layer containing a fluorine-based surfactant on one surface of a polyester film; and a layer containing a water-soluble copolyester resin, silica particles, and sodium diphenyl ether sulfonate (TB702 manufactured by Matsumoto Yushi-Seiyaku Co., Ltd.) as an antistatic agent on the other surface is described. The ink jet recording material described in JP1997-20069A (JP-H09-20069A) is used to produce a print for an overhead projector (OHP), a decorative illumination advertisement, or the like.

In JP1997-66665A (JP-H09-66665A), an ink jet recording material having a light transmittance of 60% or greater in which an ink accepting layer containing an ink-absorbable resin, a curing agent, and a surfactant is provided on one surface of a base film such as a polyester film is described. JP1997-66665A (JP-H09-66665A) describes that an easily slidable layer is provided on the base film on a side opposite to a side having the ink accepting layer, and may contain an antistatic agent and the like. In the specific examples of JP1997-66665A (JP-H09-66665A), an ink jet recording material in which a layer containing a copolyester resin, a polyurethane resin, and an acrylic resin as an antistatic agent is provided as an easily slidable layer is described. The ink jet recording material described in JP1997-66665A (JP-H09-66665A) is used to produce a print for an OHP, a decorative illumination advertisement, or the like.

SUMMARY OF THE INVENTION

As described above, since a decorative illumination ink jet recording material used to form an image that is used for a decorative illumination signboard is used outdoors, a resin base such as a polyester film is included therein. An operation of installing, on a decorative illumination signboard frame, an image formed through an ink jet system on the decorative illumination ink jet recording material is performed in a place where a decorative illumination signboard is installed.

However, since the ink jet recording material described in JP1997-20069A (JP-H09-20069A) and JP1997-66665A (JP-H09-66665A) includes the resin base such as a polyester resin, the ink jet recording material itself is easily charged. Therefore, when a decorative illumination image in which an image is formed on the ink jet recording material is installed on the decorative illumination signboard frame, dust adheres to the decorative illumination image, and thus the image quality as a decorative illumination signboard may be deteriorated. In addition, in a case where an image is formed through an ink jet system on the ink jet recording material described in JP1997-20069A (JP-H09-20069A) and JP1997-66665A (JP-H09-66665A), malfunction occurs at the time of ink jet recording, and thus image density unevenness may occur, and in extreme cases, color loss may occur.

Embodiments of the invention are contrived in order to solve the above-described problems. An object thereof is to provide a decorative illumination ink jet recording material with which malfunction is unlikely to occur at the time of ink jet recording and a decorative illumination image is obtained with rare adhesion of dust thereto.

Another object of embodiments of the invention is to provide a decorative illumination image having excellent image quality with rare adhesion of dust thereto, a method of forming the decorative illumination image, and a decorative illumination signboard.

Means for achieving the object includes the following embodiments.

<1> A decorative illumination ink jet recording material comprising: a resin base; an ink accepting layer that contains a resin; a layer that contains a metal oxide; and a white layer that contains white particles and a resin, in which the ink accepting layer is disposed as an outermost layer of the decorative illumination ink jet recording material.

<2> The decorative illumination ink jet recording material according to <1>, in which the ink accepting layer is disposed on one surface of the resin base, and the layer that contains a metal oxide is disposed on the other surface.

<3> The decorative illumination ink jet recording material according to <2>, in which the white layer is disposed between the resin base and the ink accepting layer.

<4> The decorative illumination ink jet recording material according to any one of <1> to <3>, in which a surface resistivity of the resin base on a side having the layer that contains a metal oxide at a temperature of 23° C. with a relative humidity of 30% is $1.0 \times 10^{12}$ Ω/sq or less.

<5> The decorative illumination ink jet recording material according to any one of <1> to <4>, in which the metal oxide is a tin oxide.

<6> The decorative illumination ink jet recording material according to any one of <1> to <5>, in which the white particles contained in the white layer include at least one selected from titanium oxide, silica, calcium carbonate, talc, zeolite, alumina, barium sulfate, and kaolinite.

<7> The decorative illumination ink jet recording material according to any one of <1> to <6>, in which the resin contained in the white layer includes at least one selected from a polyolefin resin, an acrylic resin, a polyester resin, and a polyurethane resin.

<8> The decorative illumination ink jet recording material according to any one of <1> to <7>, in which the resin contained in the white layer has a crosslinked structure crosslinked with at least one crosslinking agent selected from an oxazoline compound, a carbodiimide compound, an epoxy compound, an isocyanate compound, and a melamine compound.

<9> The decorative illumination ink jet recording material according to any one of <1> to <8>, in which the white layer has a thickness of 0.5 μm to 10 μm.

<10> The decorative illumination ink jet recording material according to any one of <2> to <9>, further comprising: a protective layer that contains particles and a resin as an outermost layer of the decorative illumination ink jet recording material on a side opposite to a surface having the ink accepting layer.

<11> The decorative illumination ink jet recording material according to <10>, in which an average primary particle diameter of the particles contained in the protective layer is larger than the average thickness of the protective layer.

<12> The decorative illumination ink jet recording material according to <10> or <11>, in which the average primary particle diameter of the particles contained in the protective layer is 0.4 μm to 3 μm.

<13> The decorative illumination ink jet recording material according to any one of <10> to <12>, in which the resin contained in the protective layer includes a silicon-containing resin.

<14> The decorative illumination ink jet recording material according to any one of <1> to <13>, in which the resin contained in the ink accepting layer includes at least one selected from a polyester resin, a polyurethane resin, an acrylic resin, a styrene-butadiene copolymer resin, and a polyolefin resin.

<15> The decorative illumination ink jet recording material according to any one of <1> to <14>, in which the ink accepting layer has a thickness of 0.01 μm to 5 μm.

<16> A method of forming a decorative illumination image comprising: discharging a radiation-curable ink composition on the decorative illumination ink jet recording material according to any one of <1> to <15> through an ink jet system; and curing the radiation-curable ink composition by irradiating the discharged radiation-curable ink composition with radiation.

<17> A decorative illumination image that is formed by the method of forming a decorative illumination image according to <16>.

<18> A decorative illumination signboard comprising: a light source; and the decorative illumination image according to <17>.

According to an embodiment of the invention, a decorative illumination ink jet recording material with which malfunction is unlikely to occur at the time of ink jet recording and a decorative illumination image is obtained with rare adhesion of dust thereto is provided.

According to an embodiment of the invention, a decorative illumination image having excellent image quality with rare adhesion of dust thereto, a method of forming the decorative illumination image, and a decorative illumination signboard are further provided.

BRIEF DESCRIPTION OF THE DRAWINGS

FIG. 1 is a schematic cross-sectional view showing an example of a decorative illumination ink jet recording material of the invention.

DESCRIPTION OF THE PREFERRED EMBODIMENTS

The content of embodiments of the invention will be described in detail hereinbelow. The following description will be given based on a representative embodiment of the invention, but the invention is not limited to the embodiment. In the present specification, the range expressed using " . . . to . . . " means a range including the numerical values described before and after " . . . to . . . ".

<Decorative Illumination Ink Jet Recording Material>

A decorative illumination ink jet recording material according to an embodiment of the invention has a resin base, an ink accepting layer that is disposed as an outermost layer of the decorative illumination ink jet recording material and contains a resin, a layer that contains a metal oxide, and a white layer that contains white particles and a resin.

The decorative illumination ink jet recording material according to the embodiment of the invention is not particularly limited as long as ink jet recording can be performed thereon, and preferably has a form of a decorative illumination ink jet recording sheet, a decorative illumination ink jet recording film, or the like depending on the shape of the resin base to be used.

The "layer that contains a metal oxide" in the decorative illumination ink jet recording material according to the embodiment of the invention may be disposed at any position on the resin base. For example, the layer that contains a metal oxide may be disposed between the resin base and the ink accepting layer, or may be disposed on the resin base on a side opposite to the side having the ink accepting layer.

The reason why malfunction rarely occurs at the time of ink jet recording and an image with rare adhesion of dust thereto is obtained using the decorative illumination ink jet recording material according to the embodiment of the invention is not necessarily clear, but presumed as follows.

The decorative illumination ink jet recording material uses the resin base in order to maintain, for example, water resistance and the like that are required for a decorative illumination signboard. Since the decorative illumination ink jet recording material having the resin base is easily charged, a layer containing an antistatic agent is disposed on a surface of the resin base on a side opposite to the side having the ink accepting layer, as disclosed in the above-described JP1997-20069A (JP-H09-20069A) and JP1997-66665A (JP-H09-66665A).

However, in a case where an image is formed through an ink jet system using the ink jet recording material described in JP1997-20069A (JP-H09-20069A) or JP1997-66665A (JP-H09-66665A), malfunction may occur at the time of ink jet recording. Furthermore, when an operation of installing a decorative illumination image produced using the ink jet recording material described in JP1997-20069A (JP-H09-20069A) or JP1997-66665A (JP-H09-66665A) on a decorative illumination signboard frame is performed, dust may adhere to the decorative illumination image by charging, and image quality as a decorative illumination signboard may be deteriorated. It is found that malfunction at the time of ink jet recording and a phenomenon in which dust adheres to the image frequently occur as the humidity of the environment therearound is low.

In the related arts including JP1997-20069A (JP-H09-20069A) and JP1997-66665A (JP-H09-66665A), as the antistatic agent, an anionic surfactant such as sodium diphenyl ether sulfonate, or a cationic polymer is used. An organic electrolyte such as an anionic surfactant and a cationic polymer initially exhibits a function as an antistatic agent under the presence of water. Accordingly, the ink jet recording material placed under a low-humidity environment has a low moisture content, and thus the organic electrolyte does not easily exhibit a function as an antistatic agent.

The decorative illumination ink jet recording material according to the embodiment of the invention has a layer that contains a metal oxide. The layer that contains a metal oxide functions as a conductive layer regardless of the moisture content. As a result, with the decorative illumination ink jet recording material according to the embodiment of the invention, malfunction is unlikely to occur at the time of ink jet recording, and the occurrence of density unevenness, and in extreme cases, color loss is suppressed. Regarding an image formed using the decorative illumination ink jet recording material according to the embodiment of the invention, dust rarely adheres to the image even when an operation of installing the image on a decorative illumination signboard frame is performed, and image quality as a decorative illumination signboard is also rarely deteriorated.

In a particularly preferred aspect of the decorative illumination ink jet recording material, a white layer 23 containing white particles and a resin and an ink accepting layer 21 are disposed in order on one surface of a resin base 11, and a layer 31 that contains a metal oxide and a protective layer 33 containing particles and a resin are disposed in order on the other surface as shown in FIG. 1.

Hereinafter, the decorative illumination ink jet recording material according to the embodiment of the invention will be described in detail, centering on the preferred aspect shown in FIG. 1.

<Resin Base>

As the resin base 11, a sheet-shaped resin base provided with one surface (also called a front surface) and the other surface (also called a back surface or a rear surface) is used.

The resin base is preferably a plastic film, and may contain additives such as a pigment and a plasticizer.

Regarding the type of the resin included in the resin base, a polyester resin having excellent weather resistance is preferred.

The polyester resin is not particularly limited, and examples thereof include polyethylene terephthalate, polyethylene naphthalate, polybutylene terephthalate, and polybutylene naphthalate. Among these, polyethylene terephthalate is particularly preferred from the viewpoint of cost and mechanical strength.

A sheet-shaped resin base manufactured through a process including stretching is preferred, and a biaxially-stretched sheet-shaped resin base is particularly preferred from the viewpoint of mechanical strength as the resin base 11. The stretching ratio is not particularly limited, and is preferably in a range of 1.5 times to 7 times. In a case where the stretching ratio is less than 1.5 times, the mechanical strength may become insufficient, and in a case where the stretching ratio is greater than 7 times, the resin base may lack thickness uniformity. The stretching ratio is more preferably in a range of 2 times to 5 times. Two directions perpendicular to each other are particularly preferred as stretch directions, and the range of 2 times to 5 times is particularly preferred as the stretching ratio.

The thickness of the resin base 11 is preferably constant in a range of, for example, 30 µm to 500 µm, and more preferably constant in a range of 50 µm to 300 µm. As the thickness of the resin base 11 becomes smaller than 30 µm, the repulsion against bending is reduced, and handling properties deteriorate. As the thickness of the resin base 11 becomes larger than 500 µm, the display device has difficulty in downsizing and weight reduction, and the cost occupied in the manufacturing cost is also increased.

One surface and the other surface of the resin base 11 are preferably subjected to a surface treatment such as a corona discharge treatment, a vacuum glow discharge treatment, or a flame treatment since adhesion to a layer disposed on each surface is increased.

<Layer that Contains Metal Oxide>

The layer that contains a metal oxide (hereinafter, also referred to as "AS layer") contains at least a metal oxide. For example, the AS layer 31 shown in FIG. 1 is a layer containing a metal oxide and a resin, and may be disposed on a surface of the resin base 11.

Examples of the metal oxide include oxides of metals such as tin, zinc, titanium, aluminum, indium, magnesium, barium, and molybdenum. Specific examples thereof include metal oxides such as tin oxide ($SnO_2$), zinc oxide (ZnO), $TiO_2$, $Al_2O_3$, $In_2O_3$, MgO, BaO, and $MoO_3$, and metal composite oxides including two or more types of metals. The metal oxide may be a dissimilar metal composite metal oxide in which a metal oxide or a metal composite oxide contains a dissimilar atom.

As the metal oxide, $SnO_2$, ZnO, $TiO_2$, $Al_2O_3$, $In_2O_3$, or MgO is preferred, and $SnO_2$ is particularly preferred. As $SnO_2$, $SnO_2$ doped with antimony is preferred, and $SnO_2$ doped with 0.2 mol % to 2.0 mol % of antimony is particularly preferred.

The metal oxide are formed as particles. The shape thereof is not particularly limited, and includes shapes such as a spherical shape, a cube shape, an octahedron shape, a needle shape, and a spindle shape. The average primary particle diameter of the metal oxide is preferably 0.4 µm to 3.0 µm. In a case where the average primary particle diameter of the metal oxide is within the above-described range, it is possible to easily obtain a decorative illumination ink jet recording material with which malfunction rarely occurs at the time of ink jet recording and an image with rare adhesion of dust thereto is obtained.

In the embodiment of the invention, the average particle diameter of the metal oxide is a value of the average primary particle diameter calculated by observing particles with a scanning electron microscope (SEM) and obtaining projected area equivalent circle diameters of 50 particles from the obtained photograph.

The appropriate amount of the metal oxide contained in the AS layer 31 is 10 mass % to 80 mass % with respect to the mass of the total solid content of the AS layer 31. In a case where the amount of the metal oxide is within the above-described range, it is possible to easily obtain a decorative illumination ink jet recording material with which malfunction rarely occurs at the time of ink jet recording according to the embodiment of the invention and an image with rare adhesion of dust thereto is obtained. The lower limit of the amount of the metal oxide contained in the AS layer 31 is more preferably 30 mass % or greater with respect to the mass of the total solid content of the AS layer 31. The upper limit of the amount of the metal oxide contained in the AS layer 31 is more preferably 60 mass % or less with respect to the mass of the total solid content of the AS layer 31.

[Resin Contained in AS Layer]

The resin contained in the AS layer 31 functions as a binder that uniformly disperses the metal oxide and attaches the metal oxide to the other surface of the resin base. The resin contained in the AS layer 31 may be any one of a water-insoluble resin, a water-soluble resin, and a water-dispersible resin. In view of less environmental load, the resin is preferably a water-soluble or water-dispersible resin.

The resin contained in the AS layer 31 preferably includes at least one selected from a polyester resin, a polyurethane resin, and an acrylic resin.

[Polyester Resin]

A polyester resin is a general term for polymers whose main chain has an ester bond and can be generally obtained by a reaction between a dicarboxylic acid and a polyol. Examples of the dicarboxylic acid include fumaric acid, itaconic acid, adipic acid, sebacic acid, terephthalic acid, isophthalic acid, sulfoisophthalic acid, and naphthalene dicarboxylic acid. Examples of the polyol include ethylene glycol, propylene glycol, glycerin, hexanetriol, butanediol, hexanediol, and 1,4-cyclohexanedimethanol. A polyester resin and the raw material thereof are described in "Handbook of Polyester Resin" (written by Eiichiro Takiyama, NIKKAN KOGYO SHIMBUN, LTD., published in 1988), and the description can be applied to the embodiments of the invention.

Examples of the polyester resin include polyhydroxy butyrate (PHB)-based, polycaprolactone (PCL)-based, polycaprolactone butylene succinate-based, polybutylene succinate (PBS)-based, polybutylene succinate adipate (PBSA)-based, polybutylene succinate carbonate-based, polyethylene terephthalate succinate-based, polybutylene adipate terephthalate-based, polytetramethylene adipate terephthalate-based, polybutylene adipate terephthalate-based, polyethylene succinate (PES)-based, polyglycolic acid (PGA)-based, and polylactic acid (PLA)-based polyesters, a carbonate copolymer of aliphatic polyester, and a copolymer of aliphatic polyester and polyamide. As the polyester resin, a commercially available product such as FINETEX (registered trademark) ES650, ES2200 (manufactured by DIC Corporation), VYLONAL (registered trademark) MD1245, MD1400, MD1480 (manufactured by TOYOBO CO., LTD.), PESUREJIN (registered trademark) A-110, A-124GP, A-520, A-640 (manufactured by TAKAMATSU OIL & FAT CO., LTD.), PLASCOAT (registered trademark) Z561, Z730, Z687, and Z592 (manufactured by GOO CHEMICAL CO., LTD.) is also available.

[Polyurethane Resin]

Polyurethane is a general term for polymers whose main chain has a urethane bond and can be generally obtained by a reaction between a diisocyanate and a polyol. Examples of the diisocyanate include toluene diisocyanate (TDI), diphenylmethane diisocyanate (MDI), naphthalene diisocyanate (NDI), tolidine diisocyanate (TODI), hexamethylene diisocyanate (HDI), and isophorone diisocyanate (IPDI).

Examples of the polyol include ethylene glycol, propylene glycol, glycerin, and hexanetriol. Furthermore, as the isocyanate, a polymer whose molecular weight is increased by performing a chain extension treatment on the polyurethane polymer obtained by the reaction between a diisocyanate and a polyol can also be used. The above-described diisocyanates, polyols, and chain extension treatment are described in, for example, "Handbook of Polyurethane" (edited by Keiji Iwata, NIKKAN KOGYO SHIMBUN, LTD., published in 1987). As the polyurethane-based resin, a commercially available product such as SUPERFLEX (registered trademark) 470, 210, 150HS, ELASTRON (registered trademark) H-3 (all manufactured by DKS Co., Ltd.), HYDRAN (registered trademark) AP-20, AP-40F, WLS-210 (manufactured by DIC Corporation), TAKELAC (registered trademark) W-6061 (manufactured by Mitsui Chemicals, Inc.), and OLESTER (registered trademark) UD-350 (manufactured by Mitsui Chemicals, Inc.) is also available.

[Acrylic Resin]

An acrylic resin is a polymer formed of a polymerizable monomer having a carbon-carbon double bond, that is represented by an acrylic monomer and a methacrylic monomer. The acrylic resin may be a homopolymer or a copolymer. In addition, the acrylic resin also includes copolymers of homopolymers or copolymers and other polymers (for example, polyester, polyurethane, and the like). Examples thereof include a block copolymer and a graft copolymer. The acrylic resin also includes polymers (mixtures of polymers in some cases) obtained by polymerizing polymerizable monomers having a carbon-carbon double bond in a polyester solution or a polyester dispersion liquid, and polymers (mixtures of polymers in some cases) obtained by polymerizing polymerizable monomers having a carbon-carbon double bond in a polyurethane solution or a polyurethane dispersion liquid. Similarly, the acrylic resin also includes polymers (polymer mixtures in some cases) obtained by polymerizing polymerizable monomers having a carbon-carbon double bond in another polymer solution or dispersion liquid. In order to further improve adhesion, a hydroxy group or an amino group may be included. The polymerizable monomer having a carbon-carbon double bond is not particularly limited, and examples of the monomer as a particularly representative compound include various carboxyl group-containing monomers such as acrylic acid, methacrylic acid, crotonic acid, itaconic acid, fumaric acid, maleic acid, and citraconic acid and salts thereof; various hydroxyl group-containing monomers such as 2-hydroxyethyl (meth)acrylate, 2-hydroxypropyl (meth)acrylate, 4-hydroxybutyl (meth)acrylate, monobutyl hydroxy fumarate, and monobutyl hydroxy itaconate; various (meth)acrylic acid esters such as methyl (meth)acrylate, ethyl (meth)acrylate, propyl (meth)acrylate, butyl (meth)acrylate, and lauryl (meth)acrylate; various nitrogen-containing compounds such as (meth)acrylamide, diacetone acrylamide, N-methylol acrylamide, and (meth)acrylonitrile; various styrene derivatives such as styrene, α-methylstyrene, divinyl benzene, and vinyl toluene; various vinyl esters such as vinyl propionate; various silicon-containing polymerizable monomers such as γ-methacryloxy propyl trimethoxysilane and vinyl trimethoxysilane; phosphorus-containing vinyl-based monomers; various halogenated vinyls such as vinyl chloride and vinylidene chloride; and various conjugated dienes such as butadiene. JURYMER ET-410 (manufactured by TOAGOSEI CO., LTD.) and EM-48D (manufactured by Daicel Corporation), that are acrylic acid ester copolymers, are preferably used as a commercially available product.

The AS layer 31 may contain a resin other than the above-described resins.

Examples of other resins include a polystyrene resin, a polyolefin resin, and a polyamide resin.

The appropriate amount of the resin contained in the AS layer 31 is 30 mass % to 80 mass % with respect to the mass of the total solid content of the AS layer 31. In a case where the amount of the resin is within the above-described range, it is possible to easily obtain a decorative illumination ink jet recording material with which malfunction rarely occurs at the time of ink jet recording and an image with rare adhesion of dust thereto is obtained. The lower limit of the amount of the resin contained in the AS layer 31 is more preferably 40 mass % or greater with respect to the mass of the total solid content of the AS layer 31. The upper limit of the amount of the resin contained in the AS layer 31 is more preferably 60 mass % or less with respect to the mass of the total solid content of the AS layer 31.

The AS layer 31 may contain, for example, a surfactant other than the metal oxide and the resin.

Examples of the surfactant include known anionic surfactants, nonionic surfactants, cationic surfactants, fluorine-based surfactants, and silicone-based surfactants. The surfactant is described in, for example, "Handbook of Surfactants" (edited by Ichiro Nishi, Ichiro Imai, and Masatake Kasai, Sangyo-Tosho Publishing Co., Ltd., published in 1960).

Examples of the anionic surfactants include higher fatty acid salts such as potassium stearate and potassium behenate, alkyl ether carboxylates such as sodium polyoxyethylene (hereinafter, abbreviated as POE) lauryl ether carboxylate, N-acyl-L-glutamates such as N-stearoyl-L-glutamic acid monosodium salt, higher alkyl sulfate ester salts such as sodium lauryl sulfate and potassium lauryl sulfate, alkyl ether sulfate ester salts such as POE lauryl sulfate triethanolamine and sodium POE lauryl sulfate, N-acyl sarcosinates such as sodium lauryl sarcosine, higher fatty acid amide sulfonates such as sodium N-myristoyl-N-methyl taurine, alkyl phosphates such as sodium stearyl phosphate; alkyl ether phosphates such as sodium POE oleyl ether phosphate and sodium POE stearyl ether phosphate, sulfosuccinates such as sodium di-2-ethylhexyl sulfosuccinate, sodium monolauroyl monoethanolamide polyoxyethylene sulfosuccinate, and sodium lauryl polypropylene glycol sulfosuccinate, alkyl benzene sulfonates such as sodium linear dodecyl benzene sulfonate, linear dodecyl benzene, sulfonic acid triethanolamine, linear dodecyl benzene sulfonate, and dodecyl diphenyl ether disulfonate, and higher fatty acid ester sulfate ester salts such as hardened coconut oil fatty acid sodium glycerin sulfate.

Examples of commercially available anionic surfactants include RAPISOL (registered trademark) A-90, RAPISOL RAPISOL A-80, RAPISOL BW-30, RAPISOL B-90, RAPISOL C-70 (trade name: manufactured by NOF CORPORATION), NIKKOL OTP-100 (trade name: manufactured by NIKKO CHEMICALS CO., LTD.), KOHAKURU ON, KORAKURU L-40, PHOSPHANOL 702 (trade name: manufactured by Toho Chemical Industry Co., Ltd.), BEAULIGHT A-5000, BEAULIGHT SSS, and SAND-EDDO BL (trade name: manufactured by Sanyo Chemical Industries, Ltd.).

Examples of the cationic surfactants include alkyl trimethyl ammonium salts such as stearyl trimethyl ammonium chloride and lauryl trimethyl ammonium chloride, dialkyl dimethyl ammonium salts such as distearyl dimethyl ammonium chloride, alkyl pyridinium salts such as poly(N,N-dimethyl-3,5-methylene piperidinium) chloride and cetyl pyridinium chloride, alkyl quaternary ammonium salts, alkyl dimethyl benzyl ammonium salts, alkyl isoquinolinium salts, dialkyl morpholinium salts, POE alkylamines, alkylamine salts, polyamine fatty acid derivatives, amyl alcohol fatty acid derivatives, benzalkonium chlorides, and benzethonium chloride. It is possible to suppress aggregation of particles during drying of a coating film and to form uniform unevenness on the surface using the above-described surfactant.

Examples of commercially available cationic surfactants include a phthalocyanine derivative (trade name: EFKA-745 manufactured by MORISHITA & CO., LTD.), organosiloxane polymer KP341 (manufactured by Shin-Etsu Chemical Co., Ltd.), (meth)acrylic acid-based (co)polymer polyflow No. 75, No. 90, No. 95 (manufactured by KYOEISHA CHEMICAL Co., LTD.), and W001 (manufactured by Yusho Co., Ltd.).

Examples of commercially available nonionic surfactants include NAROACTY (registered trademark) CL-95, HN-100 (trade name; manufactured by Sanyo Chemical Industries, Ltd.), LITHO REX (registered trademark) BW400 (trade name: KOKYU ALCOHOL KOGYO CO., LTD.), EMALEX (registered trademark) ET-2020 (trade name: manufactured by Nihon Emulsion Co., Ltd.), UNI-LUBE (registered trademark) 50MB-26, and NONION IS-4 (trade name: NOF CORPORATION).

The AS layer 31 preferably contains an anionic surfactant and/or a nonionic surfactant.

In a case where the AS layer 31 contains a surfactant, the amount of the surfactant is preferably 0.5 mass % to 5.0 mass %, and more preferably 0.5 mass % to 3.0 mass % with respect to the mass of the total solid content of the AS layer 31.

The thickness of the AS layer 31 is preferably in a range of 0.05 μm to 5.0 μm since it is possible to easily obtain a decorative illumination ink jet recording material with which malfunction rarely occurs at the time of ink jet recording according to the embodiment of the invention and an image with rare adhesion of dust thereto is obtained. The lower limit of the thickness of the AS layer 31 is more preferably 0.07 μm or greater. The upper limit of the thickness of the AS layer 31 is more preferably 3.0 μm or less.

A surface of the decorative illumination ink jet recording material according to the embodiment of the invention on the side having the AS layer preferably has a surface resistivity of $1.0 \times 10^{12}$ Ω/sq or less at a temperature of 23° C. with a relative humidity of 30%. In a case where the surface has a surface resistivity within the above-described range, it is possible to easily obtain a decorative illumination ink jet recording material with which malfunction rarely occurs at the time of ink jet recording and an image with rare adhesion of dust thereto is obtained. The surface resistivity of the decorative illumination ink jet recording material according to the embodiment of the invention on the side having the AS layer is more preferably $1.0 \times 10^{11}$ Ω/sq or less.

The surface resistivity can be adjusted by the type and the content of the metal oxide contained in the AS layer 31.

The "surface of the decorative illumination ink jet recording material on the side having the AS layer" means a surface of the outermost layer of the resin base on the side having the AS layer. For example, in a case where the AS layer and a protective layer to be described later are provided in order on the other surface of the resin base, the "surface of the decorative illumination ink jet recording material on the side having the AS layer" means a surface of the protective layer.

In the embodiment of the invention, the surface resistivity means a value measured based on JIS-K-6911-1995.

In regard to the AS layer according to the embodiment of the invention, the decorative illumination ink jet recording material shown in FIG. 1 has been mainly described as above, but the AS layer may be disposed between the resin base and the ink accepting layer. In a case where the white layer and the ink accepting layer are provided in order on one surface of the resin base, the AS layer may be disposed between the resin base and the white layer. Details of the AS layer for a case where the AS layer is disposed at the above-described position are as described above.

<Ink Accepting Layer>

The ink accepting layer contains at least a resin. The ink accepting layer functions to increase an adhesive force to an ink composition for ink jet recording (hereinafter, may be abbreviated as "ink") and to suppress the ink discharged from the ink jet recording device from bleeding, thereby obtaining a clear image. For example, the ink accepting layer 21 shown in FIG. 1 may be disposed as an outermost layer on one surface of the resin base 11.

In general, the ink accepting layer preferably contains a resin and a curing agent.

The resin contained in the ink accepting layer 21 is not particularly limited. At least one selected from a polyester resin, a polyurethane resin, an acrylic resin, a styrene-butadiene copolymer resin, and a polyolefin resin is preferably contained. The resin contained in the ink accepting layer 21 is particularly preferably water-soluble or water-dispersible in view of less environmental load.

Regarding the polyester resin, the polyurethane resin, and the acrylic resin, the resins described as the resin contained in the above-described AS layer can be applied, and preferred resins are also the same as above.

[Polyolefin Resin]

A polyolefin resin is a polymer obtained by polymerizing, as a starting material, an alkene such as ethylene, butylene, and propylene, and also includes a copolymer obtained by copolymerizing an alkene with a polymerizable monomer other than the alkene as starting materials.

Specific examples of the polyolefin resin are as follows.

A copolymer composed of ethylene or propylene and an acrylic monomer other than an acrylic acid or a methacrylic monomer other than a methacrylic acid A copolymer composed of ethylene or propylene and an unsaturated carboxylic acid (including anhydride)

A copolymer composed of ethylene or propylene, an acrylic monomer other than an acrylic acid or a methacrylic monomer other than a methacrylic acid, and an unsaturated carboxylic acid (including anhydride)

Specific preferred examples of the acrylic monomer other than an acrylic acid and the methacrylic monomer other than a methacrylic acid include methyl methacrylate, ethyl acrylate, butyl acrylate, and 2-hydroxyethyl acrylate.

Specific preferred examples of the unsaturated carboxylic acid include acrylic acid, methacrylic acid, itaconic acid, maleic acid, and maleic acid anhydride.

Each of the alkene, the acrylic monomer other than an acrylic acid, the methacrylic monomer other than a methacrylic acid, and the unsaturated carboxylic acid may be used alone or in combination of two or more types thereof.

The polyolefin resin may have a form of an aqueous polymer dispersion called latex. Specific examples of commercially available products thereof include BONDINE (registered trademark) HX-8210, HX-8290, TL-8030, LX-4110 (all manufactured by Sumitomo Chemical Co., Ltd.), ARROWBASE (registered trademark) SA-1200, SB-1010, SE-1013N, SE-1200 (all manufactured by UNITIKA LTD.), and Nipol (registered trademark) UFN1008 (manufactured by ZEON Corporation).

The resin of the ink accepting layer 31 preferably includes a polyester resin and a polyurethane resin. The content ratio between the polyester resin and the polyurethane resin is preferably 0.1:0.9 to 0.9:0.1, more preferably 0.3:0.7 to 0.7:0.3, and particularly preferably 0.4:0.6 to 0.6:0.4 in terms of a mass ratio of polyester resin:polyurethane resin.

The ink accepting layer may contain a crosslinking agent, and may have a structure in which the resin contained in the ink accepting layer is crosslinked with a crosslinking agent.

The crosslinking agent preferably includes at least one selected from an oxazoline compound and a carbodiimide compound.

[Oxazoline Compound]

An oxazoline compound is a compound having two or more oxazoline groups in a molecule.

Examples of the oxazoline compound include a polymer having an oxazoline group, for example, a polymer obtained by copolymerizing a polymerizable unsaturated monomer having an oxazoline group with another polymerizable unsaturated monomer as needed through a known method (for example, solution polymerization or emulsion polymerization). Examples of the polymerizable unsaturated monomer having an oxazoline group include monomers containing 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, or 2-isopropenyl-5-methyl-2-oxazoline in units of monomer. These monomers may be used in combination of two or more types thereof. As the oxazoline compound, a commercially available product such as EPOCROS (registered trademark) K-2020E, EPOCROS K-2010E, EPOCROS K-2020E, EPOCROS K-2030E, EPOCROS WS-300, EPOCROS WS-500, and EPOCROS WS-700 (all manufactured by NIPPON SHOKUBAI CO., LTD.) is also available.

[Carbodiimide Compound]

A carbodiimide compound is a compound having a functional group represented by —N=C=N—. In general, polycarbodiimide is synthesized by a condensation reaction of organic diisocyanate. An organic group of the organic diisocyanate to be used for the synthesis is not particularly limited, and any one of an aromatic group and an aliphatic group, or a mixture thereof can be used. From the viewpoint of reactivity, an aliphatic group is particularly preferred. As raw materials for synthesis, organic isocyanate, organic diisocyanate, organic triisocyanate, or the like is used. Examples of the organic isocyanate include aromatic isocyanate, aliphatic isocyanate, and mixtures thereof.

Specific examples thereof include 4,4'-diphenylmethane diisocyanate, 4,4-diphenyldimethylmethane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethylhexamethylene diisocyanate, 4,4'-dicyclohexylmethane diisocyanate, and 1,3-phenylene diisocyanate, and as an organic monoisocyanate, isophorone isocyanate, phenyl isocyanate, cyclohexyl isocyanate, butyl isocyanate, naphthyl isocyanate, and the like are used. As the carbodiimide compound, a commercially available product such as CARBODILITE (registered trademark) V-02-L2 (manufactured by Nisshinbo Holdings Inc.) is also available.

The crosslinking agent is preferably contained in a range of 3 mass % to 30 mass %, and more preferably in a range of 3 mass % to 20 mass % with respect to the resin.

In a case where the crosslinking agent is contained in an amount of 3 mass % or greater with respect to the resin, there is an advantage in that the ink easily penetrates into the ink accepting layer, and thus an image that is excellent in adhesion between the ink accepting layer and the ink after image formation is easily obtained. By virtue of the fact that the crosslinking agent is contained in a range of 30 mass % of less with respect to the resin, in a case where the resin of the ink accepting layer forms a crosslinked structure with the crosslinking agent, an appropriate amount of a crosslinked structure is formed, and thus, an image with high adhesion between the ink and the ink accepting layer is maintained even in a case of being exposed to, for example, a high temperature and high humidity environment in which the temperature is 60° C. or greater and the humidity is 90% or greater for a long period of time.

The ink accepting layer may contain a surfactant, a lubricant, an anti-foaming agent, a dye, a fluorescent whitening agent, a preservative, a water resistant additive, particles, and the like if necessary.

As the surfactant, the surfactants described as the surfactant contained in the above-described AS layer can be used.

[Lubricant]

As the lubricant, an aliphatic wax or the like is preferably used.

Specific examples of the aliphatic wax include vegetable waxes such as a carnauba wax, a candelilla wax, a rice wax, a Japan wax, jojoba oil, a palm wax, a rosin-modified wax, an ouricury wax, a sugar cane wax, an esparto wax, and a bark wax; animal waxes such as a bees wax, lanolin, a whale wax, an insect wax, and a shellac wax; mineral waxes such as a montan wax, ozocerite, and a ceresin wax; petroleum-based waxes such as a paraffin wax, a microcrystalline wax, and petrolactam; and synthetic hydrocarbon-based waxes such as a Fischer-Tropsch wax, a polyethylene wax, a polyethylene oxide wax, a polypropylene wax, and a polypropylene oxide wax. Among these, a carnauba wax, a paraffin wax, and a polyethylene wax are particularly preferred.

The lubricant can be used as an aqueous dispersion in view of less environmental load and good handleability. Examples of commercially available products thereof include CELLOSOL (registered trademark) 524 (manufactured by CHUKYO YUSHI CO., LTD.).

The lubricants may be used alone or in combination of two or more types thereof.

[Preservative]

Examples of the preservative include sodium dehydroacetate, sodium benzoate, sodium pyridinethione-1-oxide, p-hydroxybenzoic acid ethyl ester, 1,2-benzothiazoline-3-on, sodium sorbate, and sodium pentachlorophenol.

The thickness of the ink accepting layer can be controlled by adjusting the amount of coating with a coating liquid for forming the ink accepting layer. In order to increase transparency and exhibit an excellent adhesive force to an ink in a case where a decorative illumination signboard is made, the thickness of the ink accepting layer is preferably constant in a range of 0.01 μm to 5 μm.

In a case where the thickness is 0.01 μm or greater, the adhesive force to an ink can be more securely improved as compared to a case where the thickness is less than 0.01 μm. On the other hand, in a case where the thickness is 5 μm or less, the ink accepting layer can be formed so as to have a more uniform thickness as compared to a case where the thickness is greater than 5 μm. Moreover, an increase in the amount of the coating liquid used is suppressed, and thus a drying time can be prevented from being increased, and an increase in the cost can be inhibited.

The thickness of the ink accepting layer is more preferably in a range of 0.02 μm to 3 μm, and even more preferably 0.1 μm to 1 μm.

The decorative illumination ink jet recording material according to the embodiment of the invention has a white layer containing white particles and a resin.

In the decorative illumination ink jet recording material shown in FIG. 1 according to a particularly preferred aspect of the decorative illumination ink jet recording material according to the embodiment of the invention, the white layer 23 is disposed between the resin base 11 and the ink accepting layer 21.

<White Layer>

The white layer contains at least white particles and a resin. For example, as shown in FIG. 1, the white layer can be disposed between the resin base 11 and the ink accepting layer 21 on one surface of the resin base 11 on which the AS layer 31 is not provided.

[White Particles]

The white particles contained in the white layer are preferably at least one selected from titanium oxide, silica, calcium carbonate, talc, zeolite, alumina, barium sulfate, and kaolinite since a clear decorative illumination image is obtained. Among these, a rutile-type titanium oxide called a titanium white is preferred since it is excellent in performance of reflecting light having a wavelength in a visible range.

The average primary particle diameter of the titanium oxide is preferably in a range of 0.1 μm to 10 μm. The average primary particle diameter is a value calculated by observing particles using a scanning electron microscope (SEM) and obtaining projected area equivalent circle diameters of 50 particles from the obtained photograph.

The resin contained in the white layer preferably has excellent adhesion to the resin base 11 and the ink accepting layer 21, and from such a viewpoint, at least one of a polyolefin resin, an acrylic resin, a polyester resin, or a polystyrene resin is preferably contained. Among these, a polyolefin resin is preferably contained in an amount of at least 10 mass %, more preferably in a range of 10 mass % to 95 mass %, and particularly preferably in a range of 20 mass % to 93 mass % with respect to the total mass of the resin contained in the white layer.

[Polyolefin Resin]

Examples of the polyolefin resin used in the white layer 23 include the polyolefin resins described as the resin of the above-described ink accepting layer.

The weight-average molecular weight of the polyolefin resin is preferably about 2,000 to 200,000. The polyolefin resin may have a linear chain structure or a branched structure.

The polyolefin resin is preferably used as an aqueous dispersion called latex. As a method of preparing an aqueous dispersion of a polyolefin resin, a method using emulsification and a method using emulsification and dispersion are used, and the former is preferred. Regarding the specific method thereof, for example, the method described in JP3699935B can be referred to.

In a case where the polyolefin resin has a form of an aqueous dispersion, the polyolefin resin preferably has a hydrophilic functional group such as a carboxylic group and a hydroxyl group. In a case where the polyolefin resin has a form of an aqueous dispersion, it may contain an emulsion stabilizer such as a surfactant (example: anionic or nonionic surfactant) and a polymer (example: polyvinyl alcohol) in order to improve stability. If necessary, compounds known as a latex additive such as a pH adjusting agent (example: ammonia, trimethylamine, sodium hydrogen carbonate), a preservative (example: 1,3,5-hexahydro-(2-hydroxyethyl)-s-triazine, 2-(4-thiazolyl)benzimidazole), a thickener (example: sodium polyacrylate, methyl cellulose), and a film formation assistant (example: butyl carbitol acetate) may be added thereto.

The aqueous dispersion of the polyolefin resin is commercially available, and can also be used in the embodiment of the invention. Specific examples of commercially available products thereof include BONDINE HX-8210, HX-8290, TL-8030, LX-4110 (all manufactured by Sumitomo Chemical Co., Ltd.), ARROWBASE (registered trademark) SA-1200, SB-1010, SE-1013N, SE-1200 (all manufactured by UNITIKA LTD.), and Nipol (registered trademark) UFN1008 (manufactured by ZEON Corporation).

[Acrylic Resin]

The resin of the white layer preferably includes an acrylic resin. By combining the acrylic resin with the polyolefin resin, the breaking elongation of the white layer can be increased.

The acrylic resin is preferably contained in an amount of at least 5.0 mass %, more preferably in a range of 5.0 mass % to 80 mass %, and even more preferably in a range of 5.0 mass % to 50 mass % with respect to the total mass of the resin contained in the white layer.

Examples of the acrylic resin used as the resin of the white layer include the acrylic resins described as the resin of the above-described ink accepting layer. Preferred acrylic resins are also the same as in the description of the preferred acrylic resins of the above-described ink accepting layer.

[Polyester Resin]

The resin of the white layer may include a polyester resin. As the polyester resin, the same one as the polyester resin contained in the ink accepting layer can be used, and a preferred range thereof is also the same.

(Crosslinking Agent)

In the white layer, the resin contained in the white layer is preferably crosslinked with a crosslinking agent. The resin crosslinked with a crosslinking agent is effective for further increasing the adhesion between the ink accepting layer and the resin base. The crosslinking agent may cause a crosslinking reaction with the resin contained in the white layer.

As the crosslinking agent used in the white layer, an oxazoline compound, a carbodiimide compound, an epoxy compound, an isocyanate compound, and a melamine compound are preferred, and two or more types of crosslinking agents may be used in combination. An oxazoline compound and a carbodiimide compound are particularly preferred.

Regarding the carbodiimide compound and the oxazoline compound, the same one as the crosslinking agent contained in the ink accepting layer can be used, and a preferred range thereof is also the same.

Details of the epoxy compound, the isocyanate compound, and the melamine compound will be described later.

The amount of the crosslinking agent is preferably in a range of 1 mass % to 50 mass %, more preferably in a range of 3 mass % to 30 mass %, and even more preferably in a range of 5 mass % to 25 mass % based on the total amount of the solid content of the white layer.

[Epoxy Compound]

An epoxy compound is a compound that has an epoxy group in a molecule and is obtained as a result of the reaction of the epoxy group. Examples of the compound having an epoxy group in a molecule include a condensate of epichlorohydrin, ethylene glycol, polyethylene glycol, glycerin, polyglycerin, or bisphenol A with a hydroxyl group or an amino group. The compound having an epoxy group in a molecule includes a polyepoxy compound, a diepoxy compound, a monoepoxy compound, a glycidyl amine compound, and the like. Examples of the polyepoxy compound include sorbitol, polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether, and trimethylolpropane polyglycidyl ether. Examples of the diepoxy compound include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether, and polytetramethylene glycol diglycidyl ether. Examples of the monoepoxy compound include allyl glycidyl ether, 2-ethylhexyl glycidyl ether, and phenyl glycidyl ether. Examples of the glycidyl amine compound include N,N,N',N'-tetraglycidyl-m-xylylenediamine, and 1,3-bis(N,N-diglycidylamino)cyclohexane. Specific examples of commercially available water-soluble monomers having an epoxy group include "DENACOL (registered trademark)-614B" (sorbitol polyglycidyl ether, epoxy equivalent of 173, manufactured by Nagase ChemteX Corporation), "DENACOL-EX-313" (glycerol polyglycidyl ether, epoxy equivalent of 141, manufactured by Nagase ChemteX Corporation), "DENACOL-EX-521" (polyglycerol polyglycidyl ether, epoxy equivalent of 168, manufactured by Nagase ChemteX Corporation), and "DENACOL-EX-830" (polyethylene glycol diglycidyl ether, epoxy equivalent of 268, manufactured by Nagase ChemteX Corporation).

[Isocyanate Compound]

An isocyanate compound is a compound having a partial structure of —N=C=O. Examples of organic isocyanate compounds include an aromatic isocyanate and an aliphatic isocyanate, and mixtures thereof may also be used. Specifically, 4,4'-diphenylmethane diisocyanate, 4,4-diphenyl dimethyl methane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethyl hexamethylene diisocyanate, 4,4'-dicyclohexylmethane diisocyanate, 1,3-phenylene diisocyanate, and the like are used. As an organic monoisocyanate, isophorone isocyanate, phenyl isocyanate, cyclohexyl isocyanate, butyl isocyanate, naphthyl isocyanate, and the like are used. Examples of commercially available isocyanate compounds include ELASTRON (registered trademark) H-3 (manufactured by DKS Co., Ltd.), DP9C214 (manufactured by Baxenden Chemicals Ltd.), and TAKENATE (registered trademark) XWD-HS30 (manufactured by Mitsui Chemicals, Inc.).

[Melamine Compound]

A melamine compound is a compound having two or more methylol groups in a molecule. In this embodiment, the compound can be used without particular limitation. Examples of the melamine compound include hexamethylol melamine. Examples of commercially available melamine compounds include BECKAMINE (registered trademark) PM-N, BECKAMINE J-101, and BECKAMINE M-3 (manufactured by DIC Corporation).

(Others)

If necessary, the white layer may contain, other than the resin and the crosslinking agent, a surfactant, an anti-foaming agent, a foam suppressor, a dye, a fluorescent whitening agent, a preservative, a water resistant additive, an antistatic agent, and the like.

The appropriate thickness of the white layer is in a range of 0.5 µm to 10 µm from the viewpoint that the ink jet-recorded image formed on the surface of the ink accepting layer can be visually clearly recognized.

The thickness of the white layer is preferably in a range of 0.5 µm to 8.0 µm, and more preferably in a range of 0.5 µm to 6.0 µm.

<Protective Layer>

In a case where the above-described AS layer 31 is disposed on the other surface of the resin base 11 as shown in FIG. 1, the protective layer 33 for protecting the AS layer 31 is preferably provided as an outermost layer of the other surface. In a case where the protective layer 33 is provided to cover the surface of the AS layer 31, physical damage on the AS layer is reduced.

The protective layer 33 preferably contains particles and a resin.

The protective layer 33 preferably contains a surfactant. As the surfactant, the surfactants described as the surfactant contained in the above-described AS layer can be used.

[Particles]

The particles contained in the protective layer are preferably at least one selected from inorganic particles and resin particles.

Examples of the inorganic particles include titanium oxide, silica, calcium carbonate, talc, zeolite, alumina, barium sulfate, and kaolinite.

As the resin particles, crosslinked resin particles are preferred, and examples thereof include crosslinked acrylic resin particles, crosslinked methacrylic resin particles, and crosslinked polystyrene resin particles.

The crosslinked resin particles may be resin particles in an aqueous dispersion liquid of resin particles called latex.

The content of the particles contained in the protective layer is preferably 20 mass % or less, and more preferably in a range of 1 mass % to 10 mass % based on the total mass of the solid content of the protective layer.

The average primary particle diameter of the particles contained in the protective layer is preferably larger than the thickness of the protective layer. The average primary particle diameter of the particles contained in the protective layer is preferably in a range of 0.4 µm to 3.0 µm.

Here, the average primary particle diameter is a value calculated by observing particles with a scanning electron microscope (SEM) and obtaining projected area equivalent circle diameters of 50 particles from the obtained photograph.

[Resin]

The resin contained in the protective layer functions as a binder with respect to the particles contained in the protective layer, and can be used if the protective layer functions to adhere to the AS layer. For example, the above-described resin of the ink accepting layer, resin contained in the AS layer, and resin of the white layer can be used as the resin contained in the protective layer. The fact that a resin having a crosslinked structure may be made by combining the above-described resin with a crosslinking agent is the same as in the cases of the above-described ink accepting layer, AS layer, and white layer.

As the resin contained in the protective layer, a silicon-containing resin is preferred in view of the fact that a protective layer having hardness of F or higher in terms of pencil hardness can be formed, and thus an excellent protection effect is obtained for the AS layer.

[Silicon-Containing Resin]

As the silicon-containing resin, a resin having a structure including a three-dimensional structure in which a silicon atom and an oxygen atom are bonded to each other is preferred, and a resin obtained by hydrolyzing and condensing an alkoxysilane (also called a silane coupling agent) is preferred.

An alkoxysilane may be a mixture obtained by combining a tetrafunctional alkoxysilane having 4 alkoxy groups with a bifunctional alkoxysilane or a trifunctional alkoxysilane having 2 or 3 alkoxy groups, and a resin obtained by hydrolyzing and condensing the mixture is particularly preferred. The alkoxysilane may be a mixture obtained by combining a bifunctional alkoxysilane, a trifunctional alkoxysilane, and a tetrafunctional alkoxysilane.

The mixing ratio between the tetrafunctional alkoxysilane and at least one selected from the bifunctional alkoxysilane and the trifunctional alkoxysilane in the mixture is preferably in a range of 25:75 to 85:15, and more preferably in a range of 30:70 to 70:30 in terms of a molar ratio of the former (tetrafunctional alkoxysilane):the latter (at least one selected from bifunctional alkoxysilane and trifunctional alkoxysilane).

Specific examples of the tetrafunctional alkoxysilane include tetramethoxysilane, tetraethoxysilane, tetrapropoxysilane, tetrabutoxysilane, methoxytriethoxysilane, ethoxytrimethoxysilane, methoxytripropoxysilane, ethoxytripropoxysilane, propoxytrimethoxysilane, propoxytriethoxysilane, and dimethoxydiethoxysilane. Among these, tetramethoxysilane and tetraethoxysilane are preferred.

The trifunctional alkoxysilane preferably has an epoxy group, and specific examples thereof include glycidyl trimethoxysilane, 3-glycidoxypropyltrimethoxysilane, 3-glycidoxypropyltriethoxysilane, 2-(3,4-epoxycyclohexyl)ethyltrimethoxysilane, and 2-(3,4-epoxycyclohexyl)ethyltriethoxysilane.

Examples of the bifunctional alkoxysilane include dimethyldimethoxysilane, diethyldimethoxysilane, dimethyldiethoxysilane, and diethyldiethoxysilane.

In a case of hydrolyzing and condensing an alkoxysilane, a catalyst is preferably contained.

[Catalyst]

An acid or a basic compound is contained as the catalyst, and these are used as they are, or used in a dissolved state in a catalyst such as water or alcohol (hereinafter, these are also collectively called an acidic catalyst and a basic catalyst, respectively).

In a case where an acid or a basic compound is dissolved in a catalyst, the concentration thereof is not particularly limited, and may be appropriately selected according to characteristics of an acid or a basic compound to be used, the desired content of the catalyst, and the like. Here, there is a tendency that the rate of the hydrolysis and polycondensation may be increased in a case where the concentration of an acid or a basic compound as the catalyst is high. However, in a case where a too high concentration of basic catalyst is used, a precipitate is generated and becomes a defect of the conductive layer in some cases. Accordingly, in a case where a basic catalyst is used, the concentration thereof is desirably 1 N or less in terms of concentration in an aqueous solution.

The type of the acidic catalyst or the basic catalyst is not particularly limited. However, in a case where it is necessary to use a high-concentration catalyst, a catalyst composed of an element that does not almost remain in the conductive layer may be used. Specific examples of the acidic catalyst include hydrogen halides such as hydrochloric acid, nitric acid, sulfuric acid, sulfurous acid, hydrogen sulfide, perchloric acid, hydrogen peroxide, carbonic acid, carboxylic acids such as formic acid and acetic acid, substituted carboxylic acids represented by the structural formula, RCOOH where R is substituted with another element or substituent, and sulfonic acids such as benzenesulfonic acid. Specific examples of the basic catalyst include ammoniacal bases such as ammonia water and amines such as ethylamine and aniline.

The catalyst is preferably used in a range of 0 mass % to 50 mass %, and more preferably in a range of 5 mass % to 25 mass % with respect to the non-volatile component of a reaction liquid for hydrolyzing and condensing the alkoxysilane. The catalysts may be used alone or in combination of two or more types thereof.

[Solvent]

The reaction liquid for hydrolyzing and condensing the alkoxysilane may contain an organic solvent.

Examples of the organic solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, the solvent is effectively added in such a range that no problems occur from the relation with a volatile organic solvent (VOC), and the amount of the solvent is preferably in a range of 50 mass % or less, and more preferably in a range of 30 mass % or less with respect to the total mass of the sol-gel coating liquid.

The reaction liquid for hydrolyzing and condensing the alkoxysilane and the above-described particles are mixed, the surface of the AS layer is coated with the mixed liquid, and heating and drying are performed thereon to cause a reaction of hydrolysis and condensation of the alkoxysilane in the coating film on the AS layer, whereby a protective layer is formed.

A suitable heating temperature is in a range of 30° C. to 200° C., and the temperature is more preferably in a range of 50° C. to 180° C. The heating and drying time is preferably 10 seconds to 300 minutes, and more preferably 1 minute to 120 minutes.

The thickness of the protective layer is preferably in a range of 0.4 μm to 3.0 μm, more preferably in a range of 0.7 μm to 2.0 μm, and particularly preferably in a range of 0.8 μm to 1.8 μm.

The average primary particle diameter of the particles contained in the protective layer is preferably larger than the average thickness of the protective layer. The average primary particle diameter of the particles contained in the protective layer is preferably in a range of 0.4 μm to 3.0 μm.

Here, the average thickness can be controlled with conditions at the time of coating, and is a value obtained by randomly measuring a distance between an upper end and a lower end of a target layer at 10 places in a transmission electron microscope (TEM) photograph, and by calculating an average distance. The average primary particle diameter is a value calculated by observing particles with a scanning electron microscope (SEM) and obtaining projected area equivalent circle diameters of 50 particles from the obtained photograph.

<Method of Manufacturing Decorative Illumination Ink Jet Recording Material>

A decorative illumination ink jet recording material 1 shown in FIG. 1 that is a preferred aspect of the embodiment of the invention is manufactured by forming a white layer 23 and an ink accepting layer 21 on one surface of a resin base 11 and forming an AS layer 31 and a protective layer 33 on the other surface.

The white layer 23 and the ink accepting layer 21 disposed on one surface of the resin base 11 can be formed by sequential coating or simultaneous multilayer coating and drying. Similarly, the AS layer 31 and the protective layer 33 disposed on the other surface of the resin base can be formed by sequential coating or simultaneous multilayer coating and drying. If necessary, other steps may be further provided.

The coating can be performed using, for example, a blade coater, an air-knife coater, a roll coater, a bar coater, a gravure coater, a reverse coater, or the like.

The amount of coating with the coating liquid used for formation of the ink accepting layer 21 is preferably 5 g/m$^2$ to 20 g/m$^2$, and more preferably 7 g/m$^2$ to 10 g/m$^2$.

The amount of coating with the coating liquid used for formation of the white layer 23 is preferably 5 g/m$^2$ to 20 g/m$^2$, and more preferably 7 g/m$^2$ to 10 g/m$^2$.

<Method of Forming Decorative Illumination Image>

A method of forming a decorative illumination image according to the embodiment of the invention includes a step of discharging a radiation-curable ink composition to a surface of the ink accepting layer of the decorative illumination ink jet recording material according to the embodiment of the invention through an ink jet system, and a step of curing the radiation-curable ink composition by irradiating the discharged radiation-curable ink composition on the ink accepting layer with radiation.

A known composition can be used as the radiation-curable ink composition used in the embodiment of the invention. A so-called solventless radiation-curable ink composition in which a volatile organic compound (VOC) as an organic solvent is not contained and a liquid polymerizable compound serves as a solvent is particularly preferred.

The radiation is not particularly limited, and widely includes α-rays, γ-rays, X-rays, ultraviolet rays, visible light rays, electron beams, and the like. Among these, ultraviolet rays and electron beams are preferred, and ultraviolet rays are particularly preferred from the viewpoint of curing sensitivity and availability of the device. Accordingly, an ultraviolet-curable ink composition is preferred in the embodiment of the invention.

Regarding the radiation-curable ink composition, for example, the description in JP2010-47015A and JP1993-214280A (JP-H05-214280A) can be referred to.

Regarding the solventless radiation-curable ink composition, for example, the description in JP2004-131725A and JP2009-299057A can be referred to.

Since the method of forming a decorative illumination image according to the embodiment of the invention includes the above-described steps, the ink composition cured on an ink jet recording material forms a color image.

Examples of the ink jet recording device that can be used in the embodiment of the invention include a device including an ink supply system, a temperature sensor, and an active radiation source.

The ink supply system has, for example, a piezo ink jet head, a storage tank that stores an ink, a supply pipe that supplies an ink from the storage tank to the ink jet head, an ink supply tank connected with the ink jet head, and a filter. The piezo ink jet head can be driven such that multi-size dots of preferably 1 pl (picoliter) to 100 pl, and more preferably 8 pl to 30 pl can be discharged with a resolution of preferably 320×320 dpi (dots per inch) to 4,000×4,000 dpi, more preferably 400×400 dpi to 1,600×1,600 dpi, and even more preferably 720×720 dpi. dpi in the embodiment of the invention indicates the number of dots per inch (2.54 cm).

Regarding an ink such as a radiation-curable ink, since ink to be discharged is desirably kept at a constant temperature, the ink jet recording device is preferably provided with means for stabilizing the ink temperature. The portion that is kept at a constant temperature is from the storage tank (also including an intermediate tank in a case where the intermediate tank is provided) that stores the ink to a discharge port of the ink jet head. That is, thermal insulation and heating are preferably performed from the storage tank to the ink jet head.

The method of controlling the temperature is not particularly limited. However, for example, a plurality of temperature sensors is preferably provided in the respective pipe portions to control the heating according to the ink flow rate and the environmental temperature. The temperature sensor can be provided near the ink supply tank and the nozzle of the ink jet head. In addition, the head unit to be heated is preferably thermally shut off or insulated such that the main body of the device is not affected by the temperature from outside air. In order to reduce a printer start-up time required for heating, or to reduce a loss of thermal energy, the thermal capacity of the whole heating unit is preferably reduced with thermal insulation against other portions.

The ink is preferably discharged after being heated preferably to 25° C. to 80° C., and more preferably to 25° C. to 50° C. to reduce the viscosity of the ink preferably to 3 mPa·s to 15 mPa·s, and more preferably to 3 mPa·s to 13 mPa·s. Particularly, in the embodiment of the invention, as the ink, an ink having an ink viscosity of 50 mPa·s or less at 25° C. is preferably used since discharge can be satisfactorily performed. Using this method, high discharge stability can be realized. Here, the viscosity is a value measured using a vibration-type viscometer (DV-II+VISCOMETER manufactured by BROOKFIELD AMETEK) and a cone plate (φ35 mm) under the environment of a temperature of 25° C. and a relative humidity of 50%.

Since the radiation-curable ink composition has a higher viscosity than an aqueous ink that is generally used as a usual ink jet recording ink, the viscosity change due to the temperature change at the time of discharge is large. The change in viscosity of the ink largely affects a change of liquid droplet size and a change of liquid droplet discharge rate, and eventually, image quality deterioration is caused. Therefore, the temperature of the ink at the time of discharge is required to be stably maintained as much as possible. In the embodiment of the invention, the appropriate temperature control width of the ink is preferably set temperature ±5° C., more preferably set temperature ±2° C., and even more preferably set temperature ±1° C.

Next, a step of curing the ink by irradiating the discharged ink with radiation will be described.

The ink discharged on the ink jet recording material according to the embodiment of the invention is cured by irradiation with radiation. Accordingly, a cured image is obtained.

In a case where the ink is irradiated with radiation, the radical polymerization initiator contained in the ink is decomposed by radiation irradiation, and thus a radical is generated, and a polymerization reaction of the radical polymerizable compound is carried out and promoted by the radical. In a case where a sensitizer is present together with the radical polymerization initiator, the sensitizer in the ink is put into an excited state by absorbing the radiation, and can promote decomposition of the radical polymerization initiator by being brought into contact with the radical polymerization initiator to achieve a curing reaction with higher sensitivity.

Here, although depending on absorption characteristics of the sensitizer, the peak wavelength of the radiation used is, for example, preferably 200 nm to 600 nm, more preferably 300 nm to 450 nm, and even more preferably 350 nm to 420 nm.

In addition, the ink has sufficient sensitivity even in a case where low-power radiation is used. Accordingly, it is appropriate that the curing is performed with an exposed surface illuminance of preferably 10 mW/cm$^2$ to 4,000 mW/cm$^2$, and more preferably 20 mW/cm$^2$ to 2,500 mW/cm$^2$.

As the radiation source, a mercury lamp, a gas or solid laser, or the like is mainly used, and as the light source used for curing the ultraviolet-curable ink jet recording ink, a mercury lamp or a metal halide lamp is widely known. Removal of mercury is strongly desired from the viewpoint of protection of the current environment, and GaN-based semiconductor ultraviolet emission is industrially and environmentally very useful. An ultraviolet light-emitting diode (UV-LED) and an ultraviolet laser diode (UV-LD) are preferred from the viewpoint of small size, long lifetime, high efficiency, and low cost.

Particularly, a UV-LED and a UV-LD can be used in a case where an ultraviolet source is required. For example, NICHIA CORPORATION puts a violet LED, of which the main emission spectrum has a wavelength between 365 nm and 420 nm, on the market. In a case where a shorter wavelength is required, a LED capable of emitting radiation centered on the wavelength between 300 nm and 370 nm, as disclosed in U.S. Pat. No. 6,084,250A, is used. Furthermore, other UV-LEDs are available and can emit radiation of different ultraviolet bands. A UV-LED is a particularly preferred radiation source in the embodiment of the invention, and a UV-LED having a peak wavelength at 350 nm to 420 nm is particularly preferred.

The maximum illuminance of the LED on a recording medium is preferably 10 mW/cm$^2$ to 2,000 mW/cm$^2$, more preferably 20 mW/cm$^2$ to 1,000 mW/cm$^2$, and particularly preferably 50 mW/cm$^2$ to 800 mW/cm$^2$.

It is appropriate for the ink to be irradiated with radiation described above preferably for 0.01 seconds to 120 seconds, and more preferably for 0.1 seconds to 90 seconds.

The radiation irradiation conditions and the basic radiation irradiation method are disclosed in JP1985-132767A (JP-S60-132767A). Specifically, a light source is provided on each of both sides of a head unit including an ink discharge device, and the head unit and the light source are scanned by a so-called shuttle method to perform the radiation irradiation. The radiation irradiation is performed after a certain period of time (preferably 0.01 seconds to 0.5 seconds, more preferably 0.01 seconds to 0.3 seconds, and even more preferably 0.01 seconds to 0.15 seconds since the ink is landed. In a case where the period of time from the landing of the ink to the irradiation is controlled to be an extremely short period of time, it is possible to prevent the ink landed on the recording medium from bleeding before curing. Furthermore, the aforementioned period of time is preferably shortened because, even when a porous recording medium is used, the ink can be exposed to light before it permeates the recording medium into a deep portion that the light of the light source does not reach, and therefore it is possible to prevent an unreacted monomer from remaining.

In addition, the curing may be completed by using another light source that is not driven. WO99/54415A discloses a method of using an optical fiber and a method of irradiating a recording portion with ultraviolet (UV) light by irradiating a mirror surface provided on a side surface of a head unit with light of a collimated light source. These curing methods can also be applied to the manufacturing method according to the embodiment of the invention.

The ink jet recording device using an ink jet system preferably uses a wide format ink jet printer system, and preferably uses a wide format UV ink jet printer system. The wide format ink jet printer system is a system in which the discharge of the ink from the ink jet recording device is performed substantially simultaneously with the irradiation of radiation for curing the discharged ink. Such a system can produce a large-sized printed material in a short period of time. The wide format printer is generally defined as a printer that can perform printing at a width of 24 inches (61 cm) or greater.

Most of such printers perform printing at a width of 44 inches (111.7 cm) to 64 inches (162.5 cm), but some of them can perform printing at a width of up to at most 197 inches (500 cm).

As the wide format UV ink jet printer system, it is possible to use a LuxelJet (registered trademark) UV360 GTW/XTW and UV550 GTW/XTW series and Acuity (registered trademark) LED 1600 (all manufactured by Fujifilm Corporation), inca SP320/SP320e/SP320S/SP320W (manufactured by Inca Digital Printers Limited), and the like.

In the method of forming a decorative illumination image, an ink set including an ink can be preferably used. For example, it is possible to use an ink set that is as a combination of a yellow ink, a cyan ink, a magenta ink, and a black composition. In order to obtain a full color image by using the ink, an ink set that is a combination of dark color inks of four colors consisting of yellow, cyan, magenta, and black is preferably used. In addition, an ink set that is a combination of a group of five colors of dark color inks of yellow, cyan, magenta, black, and white and a group of inks of light cyan and light magenta. The "dark color ink" means an ink in which the content of a pigment is greater than 1 mass % with respect to the total amount of the ink.

In order to obtain a color image through the method of forming a decorative illumination image according to the embodiment of the invention, respective color inks (ink set) are preferably used and superimposed in order from a color with low brightness. Specifically, in a case where an ink set composed of inks of yellow, cyan, magenta, and black is used, the inks are preferably applied on the ink jet recording material according to the embodiment of the invention in order of yellow, cyan, magenta, and black. In a case where an ink set including at least total seven colors of inks composed of a group of ink compositions of light cyan and light magenta and a group of dark color inks of cyan, magenta, black, white, and yellow is used, the inks are preferably applied on the ink jet recording material according to the embodiment of the invention in order of white, light cyan, light magenta, yellow, cyan, magenta, and black.

In a case where the inks are superimposed as described above in order from an ink with low brightness, the irradiated radiation easily reaches down to the ink in the lower portion. Consequently, it is possible to expect good curing sensitivity, reduction of residual monomers, and an improvement in adhesiveness. The irradiation can be performed by discharging all the color inks and exposing them to light at the same time. However, from the viewpoint of promoting the curing, the inks are preferably exposed to light one by one.

A decorative illumination image according to the embodiment of the invention is formed by the method of forming a decorative illumination image according to the embodiment of the invention.

Since the decorative illumination image according to the embodiment of the invention has a white ground color due to the white particles, it can be visually observed as a reflection image in the sunshine day time.

The decorative illumination image according to the embodiment of the invention can be made as a decorative illumination signboard by being installed on a decorative illumination frame provided with a backlight source.

The decorative illumination signboard has a backlight source and a decorative illumination image, and as the decorative illumination image, an image formed by the image forming method according to the embodiment of the invention is installed.

The decorative illumination image is preferably disposed between two types of acrylic resin plates or the like having excellent transparency and weather fastness.

The backlight source is not particularly limited, and for example, any one of a light bulb, a light-emitting diode (LED), an electroluminescent panel (ELP), one or more cold-cathode fluorescent lamp (CCFL), and a hot-cathode fluorescent lamp (HCFL) can be used.

EXAMPLES

Hereinafter, the embodiments of the invention will be described in more detail using examples. The materials, the amounts thereof used, the proportions thereof, the treatment contents, the treatment procedures, and the like shown in the following examples can be appropriately modified within a scope that does not depart from the gist of the invention. Therefore, the scope of the invention is not limited to the following specific examples.

In the following description, "parts" and "%" mean "parts by mass" and "mass %", respectively, unless otherwise specified.

Example 1

[Production of Resin Base]

A polyethylene terephthalate (hereinafter, referred to as "PET") resin polycondensed using an antimony compound as a catalyst was dried such that the moisture content thereof was reduced to 50 ppm or less, in order to melt and knead the resin in an extruder having a heater temperature set to 280° C. to 300° C. The melted and kneaded PET resin was discharged on an electrostatically charged chill roll from a die portion to obtain an amorphous PET sheet. The obtained amorphous PET sheet was stretched by 3.1 times in a traveling direction of the PET sheet, and then stretched by 3.8 times in a width direction to obtain a PET film (resin base) having a thickness of 180 μm.

[Formation of White Layer and Ink Accepting Layer]

One surface of the PET film was subjected to a corona discharge treatment under the condition of 730 J/m$^2$, and then coated with the following coating liquid A by a bar coating method. The coating film of the coating liquid A coated on one surface of the PET film was dried for 1 minute at 145° C., and thus a white layer having a thickness of 4 μm was formed on one surface of the PET film.

After a corona discharge treatment was performed under the condition of 288 J/m² on a surface of the white layer formed on one surface of the PET film, the following coating liquid B was coated thereon by a bar coating method. The coating film of the coating liquid B coated on the surface of the white layer was dried for 1 minute at 160° C., and thus an ink accepting layer having a thickness of 0.4 µm was formed on the white layer.

[Preparation of Coating Liquid A]

(Preparation of Titanium Dioxide Dispersion Liquid)

A mixture obtained by mixing components of the composition of the following titanium dioxide dispersion liquid was subjected to a dispersion treatment for 1 hour using a dyno mill-type disperser.

(Composition of Titanium Dioxide Dispersion Liquid)

Titanium Dioxide (white pigment: TIPAQUE (registered trademark) CR-95 manufactured by ISHIHARA SANGYO KAISHA, LTD., solid content: 100%, average primary particle diameter: 0.3 µm): 456.0 parts Polyvinyl Alcohol (PVA-105 manufactured by KURARAY CO., LTD., solid content: 10 mass %): 228.0 parts Surfactant (DEMOL (registered trademark) EP manufactured by Kao Corporation, solid content: 25 mass %): 55.0 parts Distilled Water: The amount thereof was adjusted such that the total mass of the titanium dioxide dispersion liquid became 1,000 parts.

(Composition of Coating Liquid A)

The composition of the coating liquid A is as follows.

Titanium Dioxide Dispersion Liquid Prepared in Above Description: 63.3 parts

Polyolefin Resin (ARROWBASE (registered trademark) SE-1013N manufactured by UNITIKA LTD., solid content: 20 mass %): 62.2 parts Acrylic Acid Ester Copolymer (JURYMER (registered trademark) ET-410 manufactured by TOAGOSEI CO., LTD., solid content: 30%): 27.9 parts Crosslinking Agent (CARBODILITE (registered trademark) V-02-L2 manufactured by Nisshinbo Holdings Inc., carbodiimide compound, solid content: 40%): 34.7 parts Surfactant (manufactured by Sanyo Chemical Industries, Ltd., 1% aqueous solution of NAROACTY (registered trademark) CL-95): 5.3 parts Surfactant (2% solution of sodium 1,2-[bis(3,3,4,4,5,5,6,6,6-nonafluorohexylcarbonyl]ethanesulfonate): 1.1 parts Aqueous Dispersion of Polystyrene Resin Particles (Nipol (registered trademark) UFN1008 manufactured by ZEON Corporation, solid content: 20 mass %, average primary particle diameter: 1.9 µm): 0.6 parts Preservative (1,2-benzothiazoline-3-on manufactured by DAITO CHEMICAL CO., LTD., methanol solvent having a solid content of 3.5%): 0.2 parts Distilled Water: The amount thereof was adjusted such that the total mass of the coating liquid A became 1,000 parts.

(Composition of Coating Liquid B)

The composition of the coating liquid B is as follows.

Aqueous Dispersion Liquid of Polyester (PLASCOAT (registered trademark) Z592 manufactured by GOO CHEMICAL CO., LTD., solid content: 25 mass %): 77.6 parts Polyurethane Resin (SUPERFLEX (registered trademark) 150HS manufactured by DKS Co., Ltd., solid content: 38 mass %): 51.1 parts Crosslinking Agent (EPOCROS (registered trademark) K-2020E manufactured by NIPPON SHOKUBAI CO., LTD., solid content: 40 mass %), oxazoline compound): 15.3 parts Surfactant (manufactured by Sanyo Chemical Industries, Ltd., 1% aqueous solution of NAROACTY (registered trademark) CL-95): 29.7 parts Surfactant (manufactured by NOF CORPORATION, 1% aqueous solution of RAPISOL (registered trademark) B-90): 12.3 parts Lubricant (carnauba wax dispersion CELLOSOL (registered trademark) 524 manufactured by CHUKYO YUSHI CO., LTD., solid content: 30 mass %): 1.8 parts Preservative (1,2-benzothiazoline-3-on manufactured by DAITO CHEMICAL CO., LTD., methanol solvent having a solid content of 3.5%): 0.7 parts Distilled Water: The amount thereof was adjusted such that the total mass of the coating liquid B became 1,000 parts.

[Formation of AS Layer]

The other surface of the PET film (a surface of the PET film on a side opposite to one surface on which the white layer and the ink accepting layer are formed) was subjected to a corona discharge treatment under the condition of 310 J/m², and then coated with the following coating liquid for an AS layer by a bar coating method. The amount of coating with the coating liquid for an AS layer was 8.4 cm³/m². The coating film of the coating liquid for an AS layer coated on the other surface of the PET film was dried for 1 minute at 145° C., and thus a layer that contains a metal oxide with an average thickness of about 0.1 µm was formed.

(Coating Liquid for AS Layer)

The composition of the coating liquid for an AS layer is as follows.

Self-Crosslinking Polyurethane Resin (TAKELAC (registered trademark) WS-5100 manufactured by Mitsui Chemicals, Inc., solid content: 30 mass %): 31.5 parts Aqueous Dispersion of Tin Dioxide Doped with Antimony (needle shape) (FS-10D manufactured by ISHIHARA SANGYO KAISHA, LTD., solid content: 20%): 43.7 parts Surfactant (manufactured by Sanyo Chemical Industries, Ltd., 10% aqueous solution of SANDEDDO (registered trademark) BL, anionic): 2.1 parts Surfactant (manufactured by Sanyo Chemical Industries, Ltd., 1% aqueous solution of NAROACTY (registered trademark) CL-95, nonionic): 21.0 parts Distilled Water: The amount thereof was adjusted such that the total mass of the coating liquid for an AS layer became 1,000 parts.

[Formation of Protective Layer]

The AS layer formed on the other surface of the PET film was subjected to a corona discharge treatment under the condition of 200 J/m², and then coated with the following coating liquid for a protective layer by a bar coating method. The amount of coating with the coating liquid for a protective layer was 13.8 cm³/m². The coating film of the coating liquid for a protective layer coated on the surface of the AS layer coated on the other surface of the PET film was dried for 1 minute at 145° C. to form a protective layer having an average thickness of about 0.85 µm, and a decorative illumination ink jet recording material 1 according to Example 1 was produced. The average thickness was measured by the above-described method.

(Preparation of Coating Liquid for Protective Layer)

The following components were used in order to prepare the coating liquid for a protective layer.

Acetic Acid Aqueous Solution (manufactured by Daicel Corporation, 1% aqueous solution of industrial acetic acid): 402.0 parts 3-Glycidoxypropyltriethoxysilane (KBE-403 manufactured by Shin-Etsu Chemical Co., Ltd.): 110.0 parts Tetraethoxysilane (KBE-04 manufactured by Shin-Etsu Chemical Co., Ltd.): 127.6 parts Curing Agent (ALUMINUM CHELATE A(W) manufactured by Kawaken Fine Chemicals Co., Ltd.): 1.3 parts Surfactant A (manufactured by Sanyo Chemical Industries, Ltd., 10% aqueous solution of SANDEDDO (registered trademark) BL, anionic): 14.7 parts Surfactant B (manufactured by Sanyo Chemical Industries, Ltd., 1% aqueous solution of NAROACTY (registered trademark) CL-95, nonionic): 40.9 parts Acrylic Resin Particles (MX-150 manufactured by Soken Chemical & Engineering Co., Ltd., average primary particle diameter: 1.5 μm): 9.2 parts Acrylic Resin Particles (MX-80H3WT manufactured by Soken Chemical & Engineering Co., Ltd., average primary particle diameter: 0.8 μm): 9.2 parts Aqueous Dispersion of Polystyrene Resin Particles (Nipol (registered trademark) UFN1008 manufactured by ZEON Corporation, solid content: 20 mass %, average primary particle diameter: 1.9 μm): 6.9 parts Distilled Water: The amount thereof was adjusted such that the total mass of the coating liquid for a protective layer became 1,000 parts.

Using the above-described components, the coating liquid for a protective layer was prepared by the following method.

While an acetic acid aqueous solution was strongly stirred in a constant-temperature tank at 25° C., 3-glycidoxypropyltriethoxysilane was added dropwise over 3 minutes. After the dropwise addition was terminated, the stirring was continued for 1 hour, and then a tetraethoxysilane was added over 5 minutes to the acetic acid aqueous solution in the constant-temperature tank at 30° C. while being strongly stirred. After the addition was terminated, the stirring was continued for 2 hours. The cooling to 10° C. was performed over 1 hour. The obtained aqueous solution was defined as an aqueous solution X.

Separately, a curing agent, surfactants A and B, distilled water, and three types of resin particles were mixed, and the mixed liquid was subjected to ultrasonic dispersion for 5 minutes. The obtained resin particle dispersion liquid was defined as an aqueous solution Y.

The aqueous solution Y and distilled water were added in order to the aqueous solution X, and then cooled to 10° C. to provide a coating liquid for a protective layer.

Example 2

A decorative illumination ink jet recording material 2 according to Example 2 was produced in the same manner as in Example 1, except that the coating liquid A was changed to the following coating liquid C.

(Coating Liquid C)

The composition of the coating liquid C is as follows.

Titanium Dioxide Dispersion Liquid (used in coating liquid A): 67.1 parts

Polyolefin Resin (used in coating liquid A): 97.3 parts

Aqueous Dispersion Liquid of Acrylic Resin (AS-563A manufactured by DAICEL FINECHEM LTD., solid content: 28 mass %): 7.8 parts Crosslinking Agent (EPOCROS (registered trademark) WS700 manufactured by NIPPON SHOKUBAI CO., LTD., oxazoline compound, solid content: 25%): 21.8 parts Surfactant (2% aqueous solution of sodium 1,2-[bis(3,3,4,4,5,5,6,6-nonafluorohexylcarbonyl)]ethanesulfonate): 0.9 parts Ammonium Secondary Phosphate Aqueous Solution (manufactured by Nippon Chemical Industrial CO., LTD., solid content: 35%): 1.7 parts Distilled Water: The amount thereof was adjusted such that the total mass of the coating liquid C became 1,000 parts.

Example 3

A decorative illumination ink jet recording material 3 according to Example 3 was produced in the same manner as in Example 1, except that in Example 1, the aqueous dispersion of tin dioxide doped with antimony in the coating liquid for an AS layer was changed to an aqueous dispersion of vanadium pentoxide-zinc oxide composite oxide (manufactured by NISSAN CHEMICAL INDUSTRIES. LTD., solid content: 30 mass %).

Example 4

A decorative illumination ink jet recording material 4 according to Example 4 was produced in the same manner as in Example 1, except that the crosslinking agent in the coating liquid B was changed to melamine.

Example 5

A decorative illumination ink jet recording material 5 according to Example 5 was produced in the same manner as in Example 1, except that in Example 1, the amount of the aqueous dispersion of tin dioxide doped with antimony in the coating liquid for an AS layer was reduced such that the surface resistivity of the surface of the protective layer at a temperature of 23° C. with a relative humidity of 30% was $1.0 \times 10^{12}$ Ω/sq.

Example 6

A decorative illumination ink jet recording material 6 according to Example 6 was produced in the same manner as in Example 1, except that the polyolefin resin in the coating liquid A was changed to an aqueous dispersion liquid of polyester (PLASCOAT (registered trademark) Z592 manufactured by GOO CHEMICAL CO., LTD., solid content: 25%).

Example 7

A decorative illumination ink jet recording material 7 according to Example 7 was produced in the same manner as in Example 1, except that the crosslinking agent in the coating liquid B was changed to ELASTRON (registered trademark) H-3 (manufactured by DKS Co., Ltd.) that was an isocyanate compound.

Examples 8 to 10

Decorative illumination ink jet recording materials 8 to 10 according to Examples 8 to 10 were produced in the same manner as in Example 1, except that the thickness of the white layer was changed from 4 μm to 0.4 μm, 0.5 μm, and 6 μm in the respective cases.

Comparative Example 1

A decorative illumination ink jet recording material C1 according to Comparative Example 1 was produced in the same manner as in Example 1, except that in Example 1, the aqueous dispersion of tin dioxide doped with antimony in the coating liquid for an AS layer was changed to a mixed solvent solution (solid content: 20%) of water/isopropyl alcohol (mass ratio: 3/7) of an acrylic resin (ADEKA CATIOACE PD-5 manufactured by ADEKA CORPORATION).

Comparative Example 2

A decorative illumination ink jet recording material C2 according to Comparative Example 2 was produced in the same manner as in Example 1, except that in Example 1, the aqueous dispersion of tin dioxide doped with antimony in the coating liquid for an AS layer was changed to a mixed solvent solution (solid content: 20%) of water/isopropyl alcohol (mass ratio: 6/4) of a surfactant (TB702 manufactured by Matsumoto Yushi-Seiyaku Co., Ltd.).

Comparative Example 3

A decorative illumination ink jet recording material C3 according to Comparative Example 3 was produced in the same manner as in Example 1, except that in Example 1, the aqueous dispersion of tin dioxide doped with antimony in the coating liquid for an AS layer was eliminated.

The produced decorative illumination ink jet recording materials 1 to 10 and C1 to C3 were evaluated as follows. The results are shown in Tables 1 and 2 to be described later.

[Surface Resistivity of Surface of Protective Layer]

A surface resistivity of the surface of the protective layer under each of two types of environments including the environment of a temperature of 23° C. and a relative humidity of 30% and the environment of a temperature of 23° C. and a relative humidity of 65% was measured through the following method.

[Method of Measuring Surface Resistivity]

A surface resistance SR ($\Omega$/sq) of the surface of the protective layer of each decorative illumination ink jet recording material was measured based on the method described in the resistivity of JIS-K-6911-1995. The surface resistance SR ($\Omega$/sq) was measured under two types of environments: after the laminated film was left for 3 hours for moisture control under the atmosphere of a temperature of 23° C. and a relative humidity of 30%; and after the laminated film was left for 3 hours for moisture control under the atmosphere of a temperature of 23° C. and a relative humidity of 65% using a resistivity chamber (12702A manufactured by ADE Corporation) and a digital ultra-high resistance and micro current meter (8340A manufactured by ADE Corporation).

The meanings of the expressions of the surface resistance in Tables 1 and 2 are as follows.

"E10": $10^{10}$
"E11": $10^{11}$
"E12": $10^{12}$
"E13": $10^{13}$
"E15": $10^{15}$

[Dust Adhesion]

Dust adhesion was evaluated as follows.

A sample was cut into a size of 10 cm×10 cm under the condition of 23° C./30 RH %. A surface on the AS layer side (a surface on a side opposite to the ink accepting layer) was rubbed 10 times with nylon cloth, and then the AS layer was held to face shredder dust at a height of 0.5 cm above the shredder dust to observe an adhesion state of the shredder dust.

A to C are acceptable product levels, and D and E are unacceptable levels.

A: No adhesion of shredder dust.
B: Shredder dust adheres over an area of ¼.
C: Shredder dust adheres over an area of ½.
D: Shredder dust adheres over an area of ¾.
E: Shredder dust adheres over the whole surface.

[Density Unevenness]

Density unevenness was evaluated as follows.

A sample was cut into a size of A-4 under the condition of 23° C./30 RH %. An ink accepting surface was rubbed 10 times with nylon cloth, and then 50 color images were printed at a wavelength of 365 nm to 405 nm and a printing speed of 22 m²/hr using a solventless radiation-curable ink (manufactured by FUJIFILM Speciality Ink System Limited, Product Nos. UVIJET (registered trademark) KO 021 White, UVIJET KO 004 Black, UVIJET KO 215 Cyan, UVIJET KO 867 Magenta, and UVIJET KO052 Yellow), and using "wide format UV ink jet press LuxelJet (registered trademark) UV550GTW manufactured by Fujifilm Corporation" as a printer.

A and B are acceptable product levels, and C to E are unacceptable levels.

A: No failure.
B: The number of prints with image density unevenness is 2 or less.
C: The number of prints with image density unevenness is 3 to 5.
D: The number of prints with image density unevenness is 6 to 8.
E: The number of prints with image density unevenness is 9 or greater.

[UV Ink Adhesiveness (Fresh)]

Production of Decorative illumination Image

As an ink, a solventless radiation-curable ink (manufactured by FUJIFILM Speciality Ink System Limited, Product Nos. UVIJET (registered trademark) KO 021 White, UVIJET KO 004 Black, UVIJET KO 215 Cyan, UVIJET KO 867 Magenta, and UVIJET KO052 Yellow) was used.

"Wide format UV ink jet press LuxelJet (registered trademark) UV550GTW manufactured by Fujifilm Corporation" was used as a printer and a color image was printed 2 times (wavelength: 365 nm to 405 nm, printing speed: 22 m²/hr) to obtain a decorative illumination image having a size of about 2 m×1.5 m.

On a surface of the decorative illumination image immediately after the printing of the color image, 11 scratches were formed using a single-edged razor blade in each of horizontal and vertical directions to form 100 squares, and then an adhesive tape (600 manufactured by 3M) was attached thereto. After complete adhesion by rubbing the tape using an eraser, the adhesive tape was peeled off in a direction vertical to the horizontal surface to obtain the number of squares peeled off in order to evaluate the magnitude of adhesion strength to ink on five scales of the following A to E as follows.

A to C are acceptable product levels, and D and E are unacceptable levels.

A: No peeling occurs
B: The number of squares peeled is 1 or greater and less than 5.
C: The number of squares peeled is 5 or greater and less than 15.

D: The number of squares peeled is 15 or greater and less than 30.

E: The number of squares peeled is 30 or greater.

[UV Ink Adhesiveness after Thermo-Treatment]

The decorative illumination image in which the color image had been printed was subjected to a thermo-treatment for leaving for 240 hours under the environment of a temperature of 60° C. and a relative humidity of 90%. The adhesiveness after the thermo-treatment was evaluated in the same manner as in the evaluation of the ink adhesiveness immediately after the above-described image formation. The adhesiveness after the thermo-treatment was evaluated on the above-described five scales of A to E.

The above-described A to C are acceptable product levels, and D and E are unacceptable levels.

TABLE 1

|  | Example 1 | Example 2 | Example 3 | Example 4 | Example 5 | Example 6 | Example 7 |
|---|---|---|---|---|---|---|---|
| Surface Resistivity (23° C./30 RH %) | E10 | E10 | E11 | E10 | E12 | E10 | E10 |
| Surface Resistivity (23° C./65 RH %) | E10 | E10 | E11 | E10 | E12 | E10 | E10 |
| Dust Adhesion (23° C./30 RH %) | B | A | B | B | C | B | B |
| Density Unevenness | A | A | A | A | B | A | A |
| UV Ink Adhesion (Fresh) | A | A | A | B | A | B | B |
| UV Ink Adhesion After Thermo-Treatment | A | A | A | C | A | B | C |

TABLE 2

|  | Example 8 | Example 9 | Example 10 | Comparative Example 1 | Comparative Example 2 | Comparative Example 3 |
|---|---|---|---|---|---|---|
| Surface Resistivity (23° C./30 RH %) | E10 | E10 | E10 | E13 | E13 | E15 |
| Surface Resistivity (23° C./65 RH %) | E10 | E10 | E10 | E11 | E10 | E15 |
| Dust Adhesion (23° C./30 RH %) | B | B | B | D | D | E |
| Density Unevenness | A | A | A | C | C | D |
| UV Ink Adhesion (Fresh) | A | A | A | A | A | A |
| UV Ink Adhesion After Thermo-Treatment | A | A | A | A | A | A |

From the results shown in Tables 1 and 2, it is found that in Examples 1 to 10, the surface resistance is $1\times10^{12}$ Ω/sq or less even under any of a low humidity environment and a high humidity environment, but in Comparative Examples 1 to 3, the surface resistance under a low humidity environment is $1\times10^{13}$ Ω/sq or greater. From the results, it is found that to the decorative illumination image formed using the decorative illumination ink jet recording material according to the embodiment of the invention, dust rarely adheres. Furthermore, it is found that image density unevenness associated with malfunction at the time of ink jet recording rarely occurs, and thus excellent image quality is obtained.

The disclosure of JP2014-157111 filed on Jul. 31, 2014, is, in its entirety, incorporated by reference in the present specification.

All of the documents, patent applications and technical standards mentioned in the present specification are incorporated by reference in the present specification to the same extent as if such individual document, patent application or technical standard was specifically and individually indicated to be incorporated by reference.

What is claimed is:

1. A decorative illumination ink jet recording material comprising:
    a resin base;
    an ink accepting layer that contains a resin;
    a layer that contains a metal oxide; and
    a white layer that contains white particles and a resin,
    wherein the ink accepting layer is disposed as an outermost layer of the decorative illumination ink jet recording material, and
    wherein a surface of the decorative illumination ink jet recording material on a side having the layer that contains the metal oxide has a surface resistivity of $1.0\times10^{12}$ Ω/sq or less at a temperature of 23° C. with a relative humidity of 30%.

2. The decorative illumination ink jet recording material according to claim 1,
    wherein the ink accepting layer is disposed on one surface of the resin base, and the layer that contains a metal oxide is disposed on the other surface.

3. The decorative illumination ink jet recording material according to claim 2,
    wherein the white layer is disposed between the resin base and the ink accepting layer.

4. The decorative illumination ink jet recording material according to claim 1,
    wherein the metal oxide is a tin oxide.

5. The decorative illumination ink jet recording material according to claim 1,
    wherein the white particles contained in the white layer include at least one selected from the group consisting of titanium oxide, silica, calcium carbonate, talc, zeolite, alumina, barium sulfate, and kaolinite.

6. The decorative illumination ink jet recording material according to claim 1, wherein the resin contained in the white layer includes at least one selected from the group consisting of a polyolefin resin, an acrylic resin, a polyester resin, and a polyurethane resin.

7. The decorative illumination ink jet recording material according to claim 1,
wherein the resin contained in the white layer has a crosslinked structure crosslinked with at least one crosslinking agent selected from the group consisting of an oxazoline compound, a carbodiimide compound, an epoxy compound, an isocyanate compound, and a melamine compound.

8. The decorative illumination ink jet recording material according to claim 1,
wherein the white layer has a thickness of 0.5 μm to 10 μm.

9. A decorative illumination ink jet recording material comprising:
a resin base;
an ink accepting layer that contains a resin;
a layer that contains a metal oxide;
a white layer that contains white particles and a resin; and
a protective layer that contains particles and a resin,
wherein the ink accepting layer is disposed as an outermost layer of the decorative illumination ink jet recording material,
wherein the ink accepting layer is disposed on one surface of the resin base, and the layer that contains a metal oxide is disposed on the other surface,
wherein the protective layer is disposed as an outermost layer of the decorative illumination ink jet recording material on a side opposite to a surface having the ink accepting layer, and
wherein a surface of the decorative illumination ink jet recording material on a side having the protective layer has a surface resistivity of $1.0 \times 10^{12}$ Ω/sq or less at a temperature of 23° C. with a relative humidity of 30%.

10. The decorative illumination ink jet recording material according to claim 9,
wherein an average primary particle diameter of the particles contained in the protective layer is larger than the average thickness of the protective layer.

11. The decorative illumination ink jet recording material according to claim 9,
wherein the average primary particle diameter of the particles contained in the protective layer is 0.4 μm to 3.0 μm.

12. The decorative illumination ink jet recording material according to claim 9,
wherein the resin contained in the protective layer includes a silicon-containing resin.

13. The decorative illumination ink jet recording material according to claim 1,
wherein the resin contained in the ink accepting layer includes at least one selected from the group consisting of a polyester resin, a polyurethane resin, an acrylic resin, a styrene-butadiene copolymer resin, and a polyolefin resin.

14. The decorative illumination ink jet recording material according to claim 1,
wherein the ink accepting layer has a thickness of 0.01 μm to 5 μm.

15. A method of forming a decorative illumination image comprising:
discharging a radiation-curable ink composition on the decorative illumination ink jet recording material according to claim 1 through an ink jet system; and
curing the radiation-curable ink composition by irradiating the discharged radiation-curable ink composition with radiation.

16. A decorative illumination image that is formed by the method of forming a decorative illumination image according to claim 15.

17. A decorative illumination signboard comprising:
a light source; and
the decorative illumination image according to claim 16.

18. The decorative illumination ink jet recording material according to claim 1,
wherein the metal oxide is a tin oxide doped with 0.2 mol % to 2.0 mol % of antimony.

19. The decorative illumination ink jet recording material according to claim 1,
wherein the average primary particle diameter of the metal oxide is 0.4 μm to 3.0 μm.

* * * * *